(12) United States Patent
Takaoka et al.

(10) Patent No.: US 8,906,272 B2
(45) Date of Patent: Dec. 9, 2014

(54) INFRA-RED REFLECTIVE MATERIAL AND PRODUCTION METHOD THEREOF, AND PAINT AND RESIN COMPOSITION CONTAINING THE SAME

(75) Inventors: Yoichi Takaoka, Kusatsu (JP); Norihiko Sanefuji, Yokkaichi (JP); Emi Ohta, Kusatsu (JP)

(73) Assignee: Ishihara Sangyo Kaisha, Ltd., Osaka (JP)

( * ) Notice: Subject to any disclaimer, the term of this patent is extended or adjusted under 35 U.S.C. 154(b) by 0 days.

(21) Appl. No.: 12/993,913

(22) PCT Filed: May 21, 2009

(86) PCT No.: PCT/JP2009/059317
§ 371 (c)(1),
(2), (4) Date: Nov. 22, 2010

(87) PCT Pub. No.: WO2009/142254
PCT Pub. Date: Nov. 26, 2009

(65) Prior Publication Data
US 2011/0068308 A1    Mar. 24, 2011

(30) Foreign Application Priority Data

May 23, 2008 (JP) ................. 2008-135937
Oct. 20, 2008 (JP) ................. 2008-269972
Feb. 5, 2009 (JP) ................. 2009-025393

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *C09D 7/12* | (2006.01) |
| *C09D 5/33* | (2006.01) |
| *C01G 25/00* | (2006.01) |
| *G02B 5/08* | (2006.01) |
| *G02B 1/02* | (2006.01) |
| *C01G 23/00* | (2006.01) |
| *C08K 3/22* | (2006.01) |
| *C08K 9/02* | (2006.01) |

(52) U.S. Cl.
CPC ........... C09D 7/1225 (2013.01); *C01P 2004/51* (2013.01); C08K 3/22 (2013.01); *C01P 2002/54* (2013.01); C01G 23/006 (2013.01); *C01P 2002/52* (2013.01); C09D 5/004 (2013.01); *C01P 2002/34* (2013.01); *C01P 2006/64* (2013.01); C01G 23/003 (2013.01); C01G 25/006 (2013.01); *C01P 2006/62* (2013.01); G02B 5/0808 (2013.01); C01G 25/00 (2013.01); *C01P 2006/63* (2013.01); *C08K 9/02* (2013.01); *C01P 2004/03* (2013.01); *C01P 2006/12* (2013.01); G02B 1/02 (2013.01)
USPC ........... 252/587; 423/598; 501/134; 501/135; 501/136

(58) Field of Classification Search
USPC ............ 252/587, 62; 501/152, 154, 134, 135, 501/136, 126, 103, 104; 423/263, 331, 326, 423/593.1, 594.3, 594.4, 598, 594.8; 106/286.2, 286.6, 287.1, 444, 449, 106/461, 464, 465, 470, 471, 31.9; 428/432, 440, 469, 702, 697, 699, 701, 428/467
See application file for complete search history.

(56) References Cited

U.S. PATENT DOCUMENTS

| | | | |
|---|---|---|---|
| 5,019,306 A | * | 5/1991 | Huang et al. .................. 264/658 |
| 6,416,868 B1 | | 7/2002 | Sullivan et al. |
| 2006/0078492 A1 | | 4/2006 | Kurozumi et al. |

FOREIGN PATENT DOCUMENTS

| | | | |
|---|---|---|---|
| CN | 1303105 | | 10/2000 |
| EP | 1 093 180 A2 | | 4/2001 |
| JP | 2538773 B2 | | 11/1987 |
| JP | 2-53887 A | | 2/1990 |
| JP | 09-202864 | * | 8/1997 ............... C09D 7/12 |
| JP | 9-202864 A | | 8/1997 |

| | | | | |
|---|---|---|---|---|
| JP | H1192144 | | 4/1999 | |
| JP | 11-293228 | * | 10/1999 | ............ C09K 3/00 |
| JP | 11-293228 A | | 10/1999 | |
| JP | 2000-72990 A | | 3/2000 | |
| JP | 2000103668 | | 4/2000 | |
| JP | 2000-264639 A | | 9/2000 | |
| JP | 2002-38048 A | | 2/2002 | |
| JP | 2002-264254 | | 9/2002 | |
| JP | 2003-277592 | | 10/2003 | |
| JP | 2003-277952 | * | 10/2003 | ............ C23C 30/00 |
| JP | 2003-277952 A | | 10/2003 | |
| JP | 2004-509053 A | | 3/2004 | |
| JP | 2005-154885 A | | 6/2005 | |
| JP | 2006-126468 A | | 5/2006 | |
| JP | 2006-294583 A | | 10/2006 | |
| JP | 2007-203495 A | | 8/2007 | |
| JP | 2008-044805 | * | 2/2008 | ............ C01G 51/00 |
| JP | 2008-44805 A | | 2/2008 | |
| JP | 2010270217 | | 12/2010 | |
| JP | 2010270218 | | 12/2010 | |

OTHER PUBLICATIONS

M. Vračar, A. Kuzmin, R. Merkle, J. Purans, E. A. Kotomin, J. Maier and O. Mathon,Jahn-Teller distortion around Fe4+ in Sr,,FexTi1—xO3 from x-ray absorption spectroscopy, x-ray diffraction, and vibrational spectroscopy,Physical Review B 76, 174107, 2007. © 2007 The American Physical Society.*

E. R. Vance, M. L. Carter, Z. Zhang, K. S. Finnie, S. J. Thomson and B. D. Begg, Materials and Engineering Science, Australian Nuclear Science and Technology Organisation, Uranium valences in perovskites, CaTiO3, Ceramic Transactions 2004, 155, Environmental Issues and Waste Management Technologies in the Ceramic and Nuclear Industries IX, 3-10.*

Yoon, K. H. et al. "Microwave Dielectric Properties and Far-IR Reflectivity . . . Ceramics," Ferroelectrics, vol. 262, No. 14, pp. 173-178.

Koichiro Ozaki et al. "Evaluation of Photo-Electric Properties of Srn+1(Ti1—xMnx)n(0.3n+1)(n=1, ∞)" Compendium of Papers to be Presented at Japan Chemistry Association Western Japan Chapter Convention, Oct. 22, 2005, vol. 2005, p. 290.

Tsai, Tsong-Ru et al. "Dielectric properties of (x)Ba($Mg_{1/3}Ta_{2/3}$)$O_3$-(1-x)Ba($Mg_{1/3}Nb_{2/3}$)$O_3$ . . . " Materials Chemistry and Physics 79, pp. 169-174 (2003).

Seabra, M.P. et al. "Processing and Dielectric Properties of La($Mg_{0.5}Ti_{0.5}$)$O_3$—$BaTiO_3$ Ceramics" Ferroelectrics, 294: pp. 165-173 (2003).

Vance, E.R. et al. "Uranium Valences in Perovskite, $CaTiO_3$" Materials and Engineering Science, Environmental Issues and Waste Management Technologies in the Ceramic and Nuclear Industries IX, V. 155, 2006, p. 1-10.

* cited by examiner

*Primary Examiner* — Bijan Ahvazi

(74) *Attorney, Agent, or Firm* — Paul E. White, Jr.; Manelli Selter PLLC

(57) ABSTRACT

An infra-red reflective material is a perovskite-like multiple oxide which includes at least an alkaline-earth metal and at least one type of element selected from a group of titanium, zirconium and niobium, and further, if necessary, manganese and/or iron, an element belonging to the IIIa group of the periodic table such as aluminum and gallium, etc., or zinc, etc., has sufficient infra-red reflective power, is excellent in thermal stability and heat resistance, and does not raise concerns on safety and environmental issues. The infra-red reflective material can be produced by, for example, mixing an alkaline-earth metal compound and a titanium compound and further, if necessary, a manganese compound and/or an iron compound, a compound belonging to the IIIa group of the periodic table, or a zinc compound in predetermined amounts, and firing the mixture. The produced multiple oxide is powdery and can be mixed with paint or a resin composition so as to be used for various purposes such as painting a roof or an outside wall of a building, a road, or a foot path in order to reduce the heat island phenomenon.

6 Claims, 2 Drawing Sheets

INFRA-RED REFLECTIVE MATERIAL AND PRODUCTION METHOD THEREOF, AND PAINT AND RESIN COMPOSITION CONTAINING THE SAME

TECHNICAL FIELD

The present invention relates to a perovskite type complex oxide infrared reflective material and a method of producing the same. The present invention also relates to a coating material and a resin composition containing the infrared reflective material, and further an infrared reflector using the coating material.

BACKGROUND ART

Infrared reflective materials are materials that reflect infrared rays included in sunlight or the like. The infrared reflective materials are used for relaxation of a heat island phenomenon, increase in air conditioning efficiency of buildings in summer, and the like because the infrared reflective materials can reduce the amount of infrared rays absorbed by a ground surface covered with asphalt, concrete, or the like, buildings, and the like.

As such an infrared reflective material, compounds containing chromium such as $Cr_2O_3$, Cu—Cr complex oxides, Fe—Cr complex oxides, Co—Fe—Cr complex oxides, and Cu—Cr—Mn complex oxides as black materials, for example, are known (see Patent Document 1). Compounds not containing chromium including complex oxides of an alkaline earth metal element and manganese such as Ca—Mn complex oxides, Ba—Mn complex oxides, and Ba—Mn complex oxides doped with 4% by weight of titanium dioxide (see Patent Document 2) and a complex oxide of a rare earth element and manganese such as Y—Mn complex oxide (see Patent Document 3) are also known. Compounds such as rod-like titanium oxide (see Patent Document 4) as white materials are also under development.

CITATION LIST

Patent Documents

PATENT DOCUMENT 1: JP 2000-72990 A
PATENT DOCUMENT 2: U.S. Pat. No. 6,416,868
PATENT DOCUMENT 3: JP 2002-038048 A
PATENT DOCUMENT 4: JP 2006-126468 A

SUMMARY OF INVENTION

Problems to be Solved by the Invention

While many of the black infrared reflective materials contain a heavy metal such as Cu, Cr, and Co, use of materials containing such a heavy metal strongly tends to be withheld. Development of materials not using Cr is urgently necessary particularly for concern about the safety. However, a problem is that the complex oxide of an alkaline earth metal element and manganese has a large amount of the alkaline earth metal to be eluted in water, and thus infrared reflectivity is reduced along with elution. In the complex oxide of a rare earth element and manganese, a problem that is pointed out is high cost because of use of an expensive rare earth element as a raw material. Moreover, much more improvement in reflectance on a long wavelength side of an infrared region is demanded of rod-like titanium oxide, which is one of the white infrared reflective materials.

Means for Solving the Problems

With development of a novel infrared reflective material, the present inventors found out that a perovskite type complex oxide containing an alkaline earth metal element and at least one element selected from titanium, zirconium, and niobium has high infrared reflectivity. The present inventors also found out that a complex oxide containing this complex oxide and a manganese element and/or an iron element serves as a black material having sufficient infrared reflectivity. Further, the inventors found out that the two complex oxides have higher infrared reflectivity when a Group IIIa element in the periodic table such as aluminum and gallium and a zinc element are contained in the two complex oxides.

The present inventors also found out that the infrared reflective material can be produced by mixing an alkaline earth metal compound with a compound of at least one element selected from titanium, zirconium, and niobium, and firing a mixture thereof; and in the case where a manganese element and/or an iron element or a Group IIIa element in the periodic table and a zinc element are contained, the infrared reflective material can be produced by further mixing a manganese compound and/or an iron compound or a compound of the Group IIIa element in the periodic table and a zinc compound when the alkaline earth metal compound is mixed with the compound of the at least one element selected from titanium, zirconium, and niobium, and firing the mixture. The inventors found out that because the thus-obtained perovskite type complex oxide is in the form of a powder, the perovskite type complex oxide can be blended with a coating material or a resin composition to be used for various applications, and completed the invention.

Namely, the present invention is an infrared reflective material comprising a perovskite type complex oxide containing at least an alkaline earth metal element and at least one element selected from titanium, zirconium, and niobium. Moreover, the present invention is an infrared reflective material comprising a perovskite type complex oxide further containing a manganese element and/or an iron element in the complex oxide. Further, the present invention is an infrared reflective material comprising a perovskite type complex oxide further containing a Group IIIa element in the periodic table such as aluminum and gallium and a zinc element in the two complex oxides.

Moreover, the present invention is a method of producing the perovskite type complex oxide infrared reflective material, a coating material and resin composition containing the perovskite type complex oxide infrared reflective material, and an infrared reflector onto which the coating material is applied.

Advantages of the Invention

The infrared reflective material according to the present invention is a perovskite type complex oxide containing at least an alkaline earth metal element and at least one element selected from titanium, zirconium, and niobium, and has sufficient infrared reflectivity. Moreover, a black material having sufficient infrared reflectivity is obtained by further containing a manganese element and/or an iron element in this complex oxide. Further, the two perovskite type complex oxides have higher infrared reflectivity when a Group IIIa element in the periodic table such as aluminum and gallium and a zinc element are contained in the two perovskite type complex oxides.

Such an infrared reflective material has high thermal stability and heat resistance because inorganic components stable with respect to heat are used, and has no concern about safety and environmental problems because chromium is not contained. Additionally, the infrared reflective material is resistant to dissolution in water, and reduction in infrared reflectivity caused by elution is small.

For that reason, the infrared reflective material can be used for relaxation of the heat island phenomenon and the like by applying the infrared reflective material to roofs and outer walls of buildings, or applying the infrared reflective material to roads and pavements.

In addition, the infrared reflective material can be produced relatively inexpensively because without using any expensive raw material, and because the infrared reflective material can be produced in the air.

DESCRIPTION OF EMBODIMENTS

Figure 1:
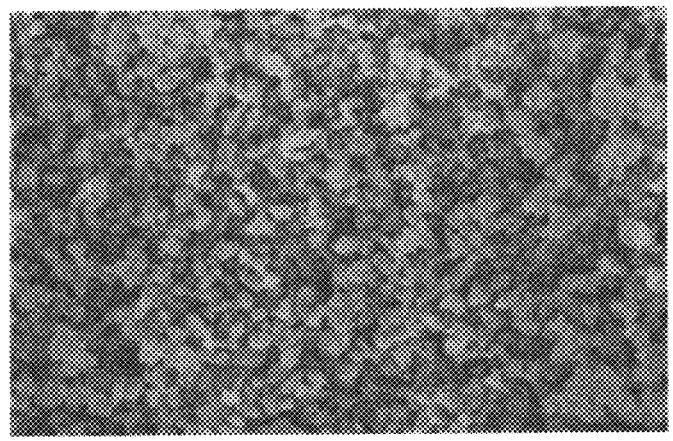
FIG. 1 is an electron micrograph showing a form of particles of Sample g obtained in Example 33.

An infrared reflective material according to the present invention is a perovskite type complex oxide containing at least an alkaline earth metal element, at least one element selected from titanium, zirconium, and niobium, and an oxygen element. Examples of the perovskite type structure include an $ABO_3$ type structure (wherein A is one or more alkaline earth metal elements, B is at least one element selected from titanium, zirconium, and niobium, and O is an oxygen element); and a layered perovskite type structure $(n(ABO_3) \cdot AO$ (wherein A, B, and O are the same as those mentioned above, the layered perovskite type structure can be expressed as $A_{n+1}B_nO_{3n+1}$, and has a structure such that an AO layer is interposed between two perovskite units of $ABO_3$. Specifically, examples of the layered perovskite type structure include $Ca_3Ti_2O_7$ and $Ca_4Ti_3O_{10}$)). For this reason, the content of the alkaline earth metal element and the content of at least one element selected from titanium, zirconium, and niobium are properly adjusted to form desired perovskite type structure. Earth metal element, at least one selected from calcium, strontium, and barium is preferable because those have high infrared reflectivity, and form a complex oxide having a perovskite type structure. Magnesium is an alkaline earth metal element. Because single use of magnesium cannot usually form the perovskite type structure but forms an ilmenite type structure, it is not preferable. However, a complex oxide having a perovskite type structure is obtained by using an alkaline earth metal element other than magnesium, e.g., calcium, strontium, and barium, in combination with a magnesium element as an alkaline earth metal element. In addition, the complex oxide has infrared reflectivity higher than that of those to which magnesium is not added, and has particularly high near-infrared reflectivity. Accordingly, addition of magnesium is preferable. The content of magnesium can be properly set according to desired performance of infrared reflectivity or the like. The atomic ratio of the magnesium element (Mg) to an alkaline earth metal (A) other than magnesium (the ratio of the number of magnesium atoms to the number of alkaline earth metal atoms other than magnesium, and sometimes referred to as a molar ratio) is preferably $1.0 \times 10^{-6} \leq Mg/A \leq 0.20$, and more preferably $1.0 \times 10^{-6} \leq Mg/A \leq 0.12$. Here, "Mg" designates the number of moles of element of magnesium, and "A" designates the number of moles of element of alkaline earth metal other than magnesium.

The infrared reflective material according to the present invention further contains a Group IIIa element in the periodic table such as boron, aluminum, gallium, and indium in the perovskite type complex oxide containing an alkaline earth metal element, at least one element selected from titanium, zirconium, and niobium, and an oxygen element. Containing of the Group IIIa element in the periodic table is more preferable because infrared reflectivity is higher than that of those to which the Group IIIa element in the periodic table is not added. Containing of at least one selected from aluminum and gallium among the Group IIIa elements in the periodic table is more preferable because particularly high near-infrared reflectivity is obtained. The Group IIIa element in the periodic table may exist on the particle surface of the perovskite type complex oxide and/or within the particles of the perovskite type complex oxide, and preferably exists within the particles of the perovskite type complex oxide. The content of the Group IIIa element in the periodic table can be properly set according to performances such as desired infrared reflectivity. An amount of $0.0005 \leq Al/B \leq 1.5$ in the atomic ratio (molar ratio) of the Group IIIa element (Al) in the periodic table to the at least one element (B) selected from titanium, zirconium, and niobium is preferably contained. Here, "Al" designates the number of moles of the Group IIIa element in the periodic table, and "B" designates the number of moles of the at least one element selected from titanium, zirconium, and niobium. A value of the atomic ratio (molar ratio) of these Al/B is preferably in the range of 0.0005 to 1.5, because high infrared reflectivity is obtained, more preferably $0.001 \leq Al/B \leq 0.45$, still more preferably $0.005 \leq Al/B \leq 0.35$, and most preferably $0.005 \leq Al/B \leq 0.25$. Due to an insufficient effect of addition, a value of Al/B smaller than 0.0005 is not preferable. Because production of another phase is started, a value of Al/B larger than 1.5 is not preferable.

Moreover, the infrared reflective material according to the present invention further contains a zinc element in the perovskite type complex oxide containing an alkaline earth metal element, at least one element selected from titanium, zirconium, and niobium and an oxygen element or in the perovskite type complex oxide further containing a Group IIIa element in the periodic table. Containing of the zinc element is preferable because infrared reflectivity is higher than that of those to which the zinc element is not added. The zinc element may exist on the particle surface of the perovskite type complex oxide and/or within the particles of the perovskite type complex oxide, and preferably exists within the particles of the perovskite type complex oxide. The content of the zinc element can be properly set according to performances such as desired infrared reflectivity. An amount of $1.0 \times 10^{-6} \leq Zn/B \leq 0.20$ in the atomic ratio (molar ratio) of the zinc element (Zn) to the at least one element (B) selected from titanium, zirconium, and niobium is preferably contained. Here, "Zn" designates the number of moles of the zinc element, and "B" designates the number of moles of the at least one element selected from titanium, zirconium, and niobium. A value of the atomic ratio (molar ratio) of these Zn/B is preferably in the range of $1.0 \times 10^{-6}$ to 0.20 because high infrared reflectivity is obtained, more preferably $1.0 \times 10^{-6} \leq Zn/B \leq 0.15$, and still more preferably $0.005 \leq Zn/B \leq 0.12$. Because of an insufficient effect of addition, a value of Zn/B smaller than $1.0 \times 10^{-6}$ is not preferable. Because production of another phase is started or a drastic change in the color of the powder is observed, a value of Zn/B larger than 0.20 is not preferable.

In the case where the infrared reflective material according to the present invention has the $ABO_3$ type perovskite type structure, the ratio of $\alpha/\beta$ is usually adjusted so as to be 1 when the content of the alkaline earth metal element is $\alpha$ mol, the total content of the at least one element selected from titanium, zirconium, and niobium, the Group IIIa element in the periodic table, and the zinc element is $\beta$ mol. A composition wherein $1<\alpha/\beta\leq1.5$, namely, the content of the alkaline earth metal element of more than 1 time and not more than 1.5 times is more preferable because the infrared reflective material of the composition has infrared reflectivity higher than that of the composition of $\alpha/\beta=1$ and has particularly high near-infrared reflectivity. A still more preferable range is $1<\alpha/\beta<1.1$.

A complex oxide that is a perovskite type complex oxide containing at least an alkaline earth metal element and at least one element selected from titanium, zirconium, and niobium, and does not contain a manganese element and/or an iron element mentioned later is a white material, and has high reflectance. Specifically, when near-infrared reflectivity is represented by reflectance of near infrared rays of sunlight at a wavelength in the range of 700 to 2100 nm (hereinafter sometimes referred to as solar reflectance, which is calculated by multiplying a weighting factor that expresses energy distribution of the sunlight by a spectral reflectance according to JIS R 3106), the solar reflectance is preferably not less than 70%, more preferably not less than 80%, and still more preferably not less than 90%. The whiteness of the complex oxide is preferably not less than 75, more preferably not less than 80, and still more preferably not less than 85, when the whiteness is expressed by a lightness L* value of CIE 1976 Lab (L*a*b* color system) (whiteness is larger as the L* value is larger). Thus, the infrared reflective material according to the present invention can have an increased lightness L* value, and therefore can be used as a white pigment.

Moreover, an a* value and a b* value of the L*a*b* color system determined in the same manner as in the case of the L* value are indices showing hue and saturation. The a* value larger toward the positive side shows that the color is redder, while the a* value larger toward the negative side shows that the color is greener. The b* value larger toward the positive side shows that the color is yellower, while the b* value larger toward the negative side shows that the color is bluer. In the complex oxide, the a* value can suppress redness to be approximately −3 to 10, and the b* value can suppress yellowness to be approximately −1 to 10, for example.

The infrared reflective material according to the present invention further contains a manganese element and/or an iron element in the perovskite type complex oxide containing the alkaline earth metal element, at least one element selected from titanium, zirconium, and niobium, and an oxygen element. Containing of the manganese element and/or the iron element increases blackness. The manganese element and the iron element may exist on the particle surface of the perovskite type complex oxide and/or within particles thereof, and preferably exists within the particles of the perovskite type complex oxide. The content of the manganese element and the iron element can be properly set according to performances such as desired infrared reflectivity and blackness. In the case where the manganese element is contained, an amount of $0.01\leq Mn/B\leq3.0$ in the atomic ratio (molar ratio) of manganese (Mn) to the at least one element (B) selected from titanium, zirconium, and niobium is preferably contained. Here, "Mn" expresses the number of moles of the manganese element, and "B" expresses the number of moles of the at least one element selected from titanium, zirconium, and niobium. A value of the atomic ratio (molar ratio) Mn/B in the range of 0.01 to 3.0 is preferable from the viewpoint of infrared reflectivity and blackness, more preferably $0.05\leq Mn/B\leq3.0$, still more preferably $0.1\leq Mn/B\leq3.0$, and most preferably $0.3\leq Mn/B\leq3.0$. Due to insufficient effect of addition and insufficient blackness, a value of Mn/B smaller than 0.01 is not preferable. Because the alkaline earth metal tends to be easily eluted when a value of Mn/B larger than 3.0, a value of Mn/B larger than 3.0 is not preferable. Moreover, in the case where the iron element is contained, an amount of $0.01\leq Fe/B\leq1.0$ in the atomic ratio (molar ratio) of iron (Fe) to the at least one element (B) selected from titanium, zirconium, and niobium is preferably contained. Here, "Fe" designates the number of moles of the iron element, and "B" designates the number of moles of the at least one element selected from titanium, zirconium, and niobium. A value of the atomic ratio (molar ratio) Fe/B in the range of 0.01 to 1.0 is preferable from the viewpoint of infrared reflectivity and blackness, more preferably $0.05\leq Fe/B\leq0.8$, and still more preferably $0.07\leq Fe/B\leq0.8$. Due to insufficient effect of addition and insufficient blackness, a value of Fe/B smaller than 0.01 is not preferable. Because synthesis as a single phase is impossible, a value of Fe/B larger than 1.0 is not preferable. Both of the manganese element and the iron element can also be contained. From the viewpoint of infrared reflectivity and blackness, it is preferable that the content of the manganese element and that of the iron element be in the above-mentioned respective ranges. In the case where the manganese element and the iron element are contained, as the alkaline earth metal element, at least one element selected from calcium, strontium and barium is preferable because of high infrared reflectivity, and because these can form a complex oxide having a perovskite type structure. A complex oxide having a perovskite type structure is obtained by using an alkaline earth metal element other than magnesium, e.g., calcium, strontium, and barium, in combination with a magnesium element as an alkaline earth metal element. In addition, the complex oxide has infrared reflectivity higher than that of those to which magnesium is not added, and has particularly high near-infrared reflectivity. Accordingly, addition of magnesium is more preferable. The content of magnesium can be properly set according to performances such as desired infrared reflectivity. The atomic ratio (molar ratio) of the magnesium element (Mg) to an alkaline earth metal (A) other than magnesium is preferably $1.0\times10^{-6}\leq Mg/A\leq0.20$, and more preferably $1.0\times10^{-6}\leq Mg/A\leq0.12$. Here, "Mg" designates the number of moles of element of magnesium, and "A" designates the number of moles of element of alkaline earth metal other than magnesium.

Moreover, the infrared reflective material according to the present invention further contains a Group IIIa element in the periodic table such as boron, aluminum, gallium, and indium in the perovskite type complex oxide containing an alkaline earth metal element, at least one element selected from titanium, zirconium, and niobium, an oxygen element, and a manganese element and/or an iron element. Containing of the Group IIIa element in the periodic table is more preferable because infrared reflectivity is higher than that of those to which the Group IIIa element in the periodic table is not added. Containing of at least one selected from aluminum and gallium among the Group IIIa elements in the periodic table is more preferable because particularly high near-infrared reflectivity is obtained. The Group IIIa element in the periodic table may exist on the particle surface of the perovskite type complex oxide and/or within the particles of the perovskite type complex oxide, and preferably exists within the particles of the perovskite type complex oxide. The content of the Group IIIa element in the periodic table can be properly set according to performances such as desired infrared reflectivity. An amount of $0.0005 \leq Al/B \leq 1.5$ in the atomic ratio (molar ratio) of the Group IIIa element (Al) in the periodic table to at least one element (B) selected from titanium, zirconium, and niobium is preferably contained. Here, "Al" designates the number of moles of the Group IIIa element in the periodic table, and "B" designates the number of moles of the at least one element selected from titanium, zirconium, and niobium. A value of the atomic ratio (molar ratio) of these Al/B is preferably in the range of 0.0005 to 1.5 from the viewpoint of infrared reflectivity and blackness, more preferably $0.001 \leq Al/B \leq 1.3$, still more preferably $0.005 \leq Al/B \leq 1.0$. Due to an insufficient effect of addition, a value of Al/B smaller than 0.0005 is not preferable. Because production of another phase is started or the color of the powder is significantly deviated, a value of Al/B larger than 1.5 is not preferable.

Moreover, the infrared reflective material according to the present invention further contains a zinc element in the perovskite type complex oxide containing an alkaline earth metal element, at least one element selected from titanium, zirconium, and niobium, an oxygen element, a manganese element and/or an iron element, or in the perovskite type complex oxide further containing a Group IIIa element in the periodic table such as boron, aluminum, gallium, and indium. Containing of the zinc element is preferable because infrared reflectivity is higher than that of those to which the zinc element is not added. The zinc element may exist on the particle surface of the perovskite type complex oxide and/or within the particles of the perovskite type complex oxide, and preferably exists within the particles of the perovskite type complex oxide. The content of the zinc element can be properly set according to performances such as desired infrared reflectivity. An amount of $1.0 \times 10^{-6} \leq Zn/B \leq 0.20$ in the atomic ratio (molar ratio) of the zinc element (Zn) to the at least one element (B) selected from titanium, zirconium, and niobium is preferably contained. Here, "Zn" designates the number of moles of the zinc element, and "B" designates the number of moles of the at least one element selected from titanium, zirconium, and niobium. A value of the atomic ratio (molar ratio) of these Zn/B is preferably in the range of $1.0 \times 10^{-6}$ to 0.2 because high infrared reflectivity is obtained, more preferably $1.0 \times 10^{-6} \leq Zn/B \leq 0.15$, and still more preferably $1.0 \times 10^{-6} \leq Zn/B \leq 0.12$. Because of an insufficient effect of addition, a value of Zn/B smaller than $1.0 \times 10^{-6}$ is not preferable. Because production of another phase is started or a drastic change in the color of the powder is observed, a value of Zn/B larger than 0.20 is not preferable.

In the case where the infrared reflective material according to the present invention has the $ABO_3$ type perovskite type structure, the ratio $\alpha/\beta$ is usually adjusted so as to be 1 when the content of the alkaline earth metal element is $\alpha$ mol, and the total content of the at least one element selected from titanium, zirconium, and niobium, the manganese element and/or the iron element, the Group IIIa element in the periodic table, and the zinc element is $\beta$ mol. A composition wherein $1<\alpha/\beta \leq 1.5$, namely, the content of the alkaline earth metal element of more than 1 time and not more than 1.5 times is more preferable because the composition has infrared reflectivity higher than that of the composition of $\alpha/\beta=1$ and has particularly high near-infrared reflectivity. A still more preferable range is $1<\alpha/\beta<1.1$.

The color of the powder changes to black in the perovskite type complex oxide containing at least an alkaline earth metal element, at least one element selected from titanium, zirconium, and niobium, and a manganese element and/or an iron element. The blackness of the complex oxide is preferably not more than 45, more preferably not more than 40, and still more preferably not more than 32, when the blackness is expressed by a lightness $L^*$ value of CIE 1976 Lab ($L^*a^*b^*$ color system), which is the same as mentioned above, (blackness is larger as the $L^*$ value is smaller). Thus, the infrared reflective material according to the present invention can have a reduced lightness $L^*$ value, and therefore can be used as a black pigment.

In the $a^*$ value and the $b^*$ value of the $L^*a^*b^*$ color system determined in the same manner as the $L^*$ value, the $a^*$ value can suppress redness to be approximately 0 to 20, and the $b^*$ value can suppress yellowness to be approximately $-1$ to 10, for example. The infrared reflectivity changes according to the color of the powder. A black powder that easily absorbs the infrared rays has infrared reflectivity relatively smaller than that of a white powder that reflects the infrared rays. From this, the complex oxide containing the manganese element and/or the iron element preferably has the solar reflectance of not less than 10%, more preferably not less than 12%, still more preferably not less than 15%, further still more preferably not less than 20%, and most preferably not less than 25%.

Amounts of the alkaline earth metal, at least one element selected from titanium, zirconium, and niobium, manganese, the iron element, the Group IIIa element in the periodic table, and the zinc element contained in the complex oxide are determined with fluorescent X-ray spectrographic analysis. The amount of oxygen necessary to maintain charge balance based on the valence of those components is calculated. The crystalline structure of the complex oxide can also be checked with X-ray diffraction.

In the infrared reflective material according to the present invention, it is thought that solute atoms form a solid solution and are contained within the particles of the complex oxide or the particle surface of the complex oxide by forming a substitutional solid solution in which solvent atoms on the lattice points of the perovskite type complex oxide (specifically, an alkaline earth metal, atoms of at least one selected from titanium, zirconium, and niobium) are replaced by the solute atoms (specifically, manganese, iron atoms, Group IIIa atoms in the periodic table, or zinc atoms), or by forming an interstitial solid solution in which solute atoms enter the lattice gaps of the perovskite type complex oxide. More specifically, it is imagined that a solid solution is formed in which the solvent atoms of at least one selected from titanium, zirconium, and niobium are replaced by the solute atoms of the manganese and/or the iron, the Group IIIa atoms in the periodic table, or the zinc. The complex oxide preferably maintains the perovskite type structure. In the $ABO_3$ type structure, at a content of the manganese element in the above-mentioned range of $0.01 \leq Mn/B \leq 3.0$, X in A:B:O:manganese atoms=1:1-X:3:X is approximately in the range of 0.01 to 0.75 in the atomic ratio (molar ratio). In the case where the iron element is contained, at the above-mentioned content of $0.01 \leq Fe/B \leq 1.0$, Y in A:B:O:iron atoms=1:1-Y:3:Y is approximately in the range of 0.01 to 0.5 in the atomic ratio (molar ratio). Containing of the manganese element, the iron element, the Group IIIa element in the periodic table, or the zinc element can be checked based on the result of the X-ray diffraction that no peak of a phase other than the complex oxide appears.

Impurities derived from various raw materials may be inevitably mixed in the infrared reflective material according to the present invention. Preferably, Cr is not contained as much as possible. Even if Cr is contained as impurities, the content thereof is not more than 1% by weight. Particularly, the content of $Cr^{6+}$ that causes concern about safety is preferably not more than 10 ppm.

The infrared reflective material according to the present invention can have various particle forms and particle sizes by changing production conditions. The particle form may be tabular, granular, approximately spherical, needle-like, and indefinite, for example. Preferably, an average particle size (arithmetic mean value of the largest diameter in one particle) measured from an electron micrograph is approximately 0.02 to 20.0 µm. At an average particle size exceeding 20.0 µm, tinting strength is reduced because the particle size is too large. At an average particle size of less than 0.02 µm, dispersion in a coating material may be difficult. For this reason, the average particle size is preferably 0.1 to 5.0 µm, more preferably 0.2 to 4.5 µm, and still more preferably 0.3 to 4.0 µm.

Moreover, preferably, a BET specific surface area value of the infrared reflective material according to the present invention (single point method according to nitrogen absorption) is approximately 0.05 to 80 $m^2/g$. At a BET specific surface area value of less than 0.05 $m^2/g$, the particles are coarse, or the particles are mutually sintered and thus tinting strength is reduced. More preferably, the BET specific surface area value is 0.2 to 15 $m^2/g$, and still more preferably 0.3 to 5 $m^2/g$. The BET specific surface area can be measured by a MONOSORB MS-18 (made by Yuasa-Ionics Company, Limited). From this BET specific surface area value, the average particle size wherein the particle form is regarded to be spherical can be calculated with the following expression 1. Preferably, the average particle size calculated from the BET specific surface area value is approximately 0.02 to 30 µm. However, it may be different from the average particle size calculated from the electron micrograph due to an influence of the particle form, particle size distribution, and the like.

$$L=6/(\rho \cdot S),\qquad \text{Expression 1}$$

wherein L is an average particle size (µm), $\rho$ is a density of a sample ($g/cm^3$), and S is a BET specific surface area value of the sample ($m^2/g$).

The infrared reflective material according to the present invention can be used for coating materials, inks, plastics, ceramics, electronic materials, and the like. In order to enhance dispersibility in a solvent and a resin to be blended, etc., the particle surface thereof may be coated with an inorganic compound and/or an organic compound when necessary. Examples of the inorganic compound preferably include a compound of at least one selected from silicon, zirconium, aluminum, titanium, antimony, phosphorus, and tin. Silicon, zirconium, aluminum, titanium, antimony, and tin are more preferably a compound of oxide, hydrated oxide, or hydroxide. Phosphorus is more preferably a compound of phosphoric acid or phosphate. Examples of the organic compound include organic silicon compounds, organometallic compounds, polyols, alkanolamines or derivatives thereof, higher fatty acids or metal salts thereof, and higher hydrocarbons or derivatives thereof. At least one selected from these can be used.

The infrared reflective material according to the present invention contains an alkaline earth metal element and at least one element selected from titanium, zirconium, and niobium, and contains a manganese element and/or an iron element, a Group IIIa element in the periodic table such as boron, aluminum, gallium, and indium, and a zinc element when necessary. The alkaline earth metal elements, the manganese element, the iron element, and the like may be eluted in water, and are easily eluted particularly in acidic water. For this reason, in the case where water elution properties need to be controlled, it is effective that the particle surface of the infrared reflective material is coated with an inorganic compound. Examples of such an inorganic compound include a compound of at least one selected from silicon, zirconium, aluminum, titanium, antimony, phosphorus, and tin. Silicon, zirconium, aluminum, titanium, antimony, and tin are more preferably a compound of oxide, hydrated oxide, or hydroxide. Phosphorus is more preferably a compound of phosphoric acid or phosphate. Particularly, oxides, hydrated oxides, or hydroxides of silicon and aluminum are preferable. More preferably, the oxides, hydrated oxides, or hydroxides of silicon (hereinafter sometimes referred to as silica) form high-density silica or porous silica. According to the pH range at the time of silica coating treatment, silica used for coating becomes porous or non-porous (high-density). However, high-density silica easily forms fine coating, and has a high effect of controlling the water elution properties of the infrared reflective material, and therefore is more preferable. For that reason, a first coating layer of high-density silica may exist on the particle surface of the infrared reflective material, and a second coating layer of porous silica or an oxide, hydrated oxide, and hydroxide of aluminum (hereinafter sometimes referred to as alumina) may exist thereon. The silica coating can be observed with an electron microscope. The amount of the inorganic compound to be coated can be set properly. For example, 0.1 to 50% by weight is preferable based on the infrared reflective material, and 1.0 to 20% by weight is more preferable. The amount of the inorganic compound can be measured by an ordinary method such as fluorescent X-ray spectrographic analysis and ICP optical emission spectrometry.

The infrared reflective material according to the present invention can be produced using a conventional method for producing a perovskite type complex oxide. Specifically, the following methods or the like can be used: the so-called solid-phase synthesis method comprising mixing an alkaline earth metal compound with a compound of at least one selected from titanium, zirconium, and niobium, and firing the mixture using an electric furnace, a rotary kiln, or the like; the so-called oxalate method comprising synthesizing an alkaline earth metal with an oxalate of at least one selected from titanium, zirconium, and niobium in a water system, and subsequently firing the mixture; the so-called citrate method comprising synthesizing an alkaline earth metal and a citrate of at least one selected from titanium, zirconium, and niobium in a water system, and subsequently firing the mixture; and the so-called hydrothermal synthesis method comprising mixing an aqueous solution of an alkaline earth metal compound and a compound of at least one selected from titanium, zirconium, and niobium with an alkaline aqueous solution, and performing a hydrothermal process, followed by filtering, washing, and drying. Moreover, in the case where the manganese element and/or the iron element, the Group IIIa element in the periodic table, or the zinc element is contained, the followings can be performed. A manganese compound, an iron compound, a compound of a Group IIIa element in the periodic table, or a zinc compound can be added and mixed at the time of mixing an alkaline earth metal compound with a compound of at least one selected from titanium, zirconium, and niobium. A manganese compound, an iron compound, a compound of a Group IIIa element in the periodic table, or a zinc compound can be added, or mixed at the time of synthesizing oxalate or the like in the water system. Alternatively, a manganese compound, an iron compound, a compound of a Group IIIa element in the periodic table, or a zinc compound can be added or fired at the time of firing a mixture of an alkaline earth metal compound with a titanium compound, or firing a synthesized product.

In the present invention, a solid-phase synthesis method comprising mixing and firing an alkaline earth metal compound and a compound of at least one selected from titanium, zirconium, and niobium is preferable because a perovskite type complex oxide having a proper particle size is obtained. In the case where an alkaline earth metal element other than magnesium as an alkaline earth metal element and a magnesium element are used in combination, a solid-phase synthesis method comprising mixing and firing a compound of such an alkaline earth metal and a compound of at least one selected from titanium, zirconium, and niobium is preferable because a perovskite type complex oxide having a proper particle size is obtained. Moreover, in the case where a manganese element and/or an iron element is contained, a method comprising adding and mixing a manganese compound and/or an iron compound and firing the mixture at the time of mixing an alkaline earth metal compound with a compound of at least one selected from titanium, zirconium, and niobium is preferable because a perovskite type complex oxide having a proper particle size is obtained. Moreover, in the case where a Group IIIa element in the periodic table or a zinc element is contained, a method comprising adding and mixing the Group IIIa compound in the periodic table or a zinc compound, and firing the mixture at the time of mixing an alkaline earth metal compound with a compound of at least one selected from titanium, zirconium, and niobium, or when necessary a manganese compound and/or an iron compound is preferable because a perovskite type complex oxide having a proper particle size is obtained. By adding and mixing a manganese compound, an iron compound, a Group IIIa compound in the periodic table, or a zinc compound at the time of mixing an alkaline earth metal compound with a compound of at least one selected from titanium, zirconium, and niobium, the manganese element, the iron element, the Group IIIa element in the periodic table, or the zinc element easily exists within the particles of the perovskite type complex oxide, and it is preferable.

In the solid-phase synthesis method, oxides, hydroxides, carbonates, and the like can be used as the alkaline earth metal compound, and oxides, hydroxides, carbonates, and the like can be used as the compound of at least one selected from titanium, zirconium, and niobium. Oxides thereof, hydroxides thereof, carbonates thereof, and the like can be used as the manganese compound, the iron compound, the compound of the Group IIIa in the periodic table, or the zinc compound. Next, each of the raw material compounds is weighed, and mixed. A mixing method may be any of a dry blending method comprising mixing raw material compounds in the state of a powder, and a wet blending method comprising mixing raw material compounds in the state of a slurry, and can be performed using the conventional mixers such as stirring mixing machines. Mixing can also be performed using various kinds of grinders, spray driers, granulators, molding machines, and the like at the time of crushing, drying, granulation, and molding. In the case where a manganese compound, an iron compound, a compound of the Group IIIa in the periodic table, or a zinc compound is mixed, and the amounts of these compounds are small, these compounds are made to exist within the particle surface of the compound of at least one selected from titanium, zirconium, and niobium and/or the particles thereof in advance. This is preferable because the solid-phase synthesis reaction is uniformly performed and thus a uniform infrared reflective material is easily obtained. From this, by depositing the manganese compound, the iron compound, the compound of the Group IIIa in the periodic table, or the zinc compound on the particle surface of the compound such as oxides, hydrated oxides, hydroxides, and the like of at least one selected from titanium, zirconium, and niobium in advance, and making these compounds to exist therein or by making these compounds to exist within the particles of such a compound in advance, the manganese element, the iron element, the Group IIIa element in the periodic table, or the zinc element easily exists within the particles of the perovskite type complex oxide, and it is preferable. The method is not particularly limited, and a known method can be used.

Next, the mixture of the raw material compounds is granulated and molded when necessary, and subsequently fired. The temperature of firing may be at least a temperature at which the raw material compounds make a solid-phase reaction. For example, the temperature may be in the range of 1000 to 1500° C. While the atmosphere at the time of firing may be any atmosphere, firing in the air is preferable in order to keep a sufficient infrared reflectivity. At the time of firing, a fusing agent such as sodium chloride and potassium chloride may be added. A firing time can be set properly, and is preferably for 0.5 to 24 hours and more preferably for 1.0 to 12 hours. At a firing time shorter than 0.5 hours, often the reaction does not sufficiently progress. On the other hand, at a firing time longer than 24 hours, hardness of the particles may be increased by sintering, or unusually coarse particles may be produced.

Moreover, in the solid-phase synthesis method, in order to perform the firing reaction more uniformly or in order to make the particle size of the infrared reflective material more uniform, a firing treatment agent (particle size regulating agent) may be added to the mixture of the raw material compounds and fired. As such a firing treatment agent, alkali metal compounds, silicon compounds such as silica and silicate, tin compounds such as tin oxide and tin hydroxide, and the compounds of the Group IIIa elements in the periodic table such as boron, aluminum, gallium, and indium can also be used. However, the firing treatment agent is not limited to these, and various inorganic compounds or organic compounds can be used. While the amount of the firing treatment agent (particle size regulating agent) to be added can be set properly, an amount not to reduce infrared reflectivity is preferable. Particularly, addition of the alkali metal compound to the mixture of the raw material compound and firing is preferable because an infrared reflective material having more uniform particle size is easily obtained. In addition, addition of the alkali metal compound also has an advantage that crushing after firing is relatively easy. Even if the alkali metal compound remains in the obtained infrared reflective material, any adverse influence on infrared reflectivity is not recognized, and the remaining alkali metal compound can be dissolved by rinsing to be removed. As the alkali metal compound, potassium compounds such as potassium chloride, potassium sulfate, potassium nitrate, and potassium carbonate, sodium compounds such as sodium chloride, sodium sulfate, sodium nitrate, and sodium carbonate, and lithium compounds such as lithium chloride, lithium sulfate, lithium nitrate, and lithium carbonate, and the like can be used. The amount of the alkali metal compound to be added in terms of conversion of an alkali metal into an oxide ($K_2O$, $Na_2O$, $Li_2O$, or the like) is preferably 0.01 to 15 parts by weight based on 100 parts by weight of the mixture of the raw material compounds, and more preferably 0.1 to 6 parts by weight.

Crystallinity of the complex oxide is further increased by firing the complex oxide obtained by the method, particularly by the solid-phase synthesis method again. This can suppress water elution properties of the alkaline earth metal elements, the manganese element, and the iron element, and is preferable. The temperature of firing the complex oxide again is preferably in the range of 200 to 1500° C., and more preferably 400 to 1200° C. While the atmosphere at the time of firing the complex oxide again may be any atmosphere, firing in the air is preferable in order to keep a sufficient infrared reflectivity. The time of firing the complex oxide again can be set properly, and is preferably for 0.5 to 24 hours and more preferably for 1.0 to 12 hours.

A conventional surface treatment method used for a titanium dioxide pigment or the like can be used to coat the particle surface of the thus-obtained infrared reflective material with an inorganic compound or an organic compound. Specifically, it is preferable that an inorganic compound or an organic compound be added to a slurry of the infrared reflective material for coating, and more preferable that the inorganic compound or the organic compound be neutralized in the slurry to deposit for coating. Alternatively, the inorganic compound or the organic compound may be added to powder of the infrared reflective material, and mixed for coating.

Specifically, to perform high-density silica coating on the particle surface of the infrared reflective material, first, an aqueous slurry of the infrared reflective material is adjusted at pH of not less than 8 and preferably at 8 to 10 with an alkali compound such as sodium hydroxide, potassium hydroxide, and ammonia, for example. Then, the aqueous slurry is heated to not less than 70° C. and preferably to 70 to 105° C. Next, a silicate is added to the aqueous slurry of the infrared reflective material. As the silicate, various silicates such as sodium silicate and potassium silicate can be used. Addition of the silicate is usually preferably performed over not less than 15 minutes, and more preferably over not less than 30 minutes. Next, after addition of the silicate is completed, further full stirring and mixing are performed when necessary. Then, the slurry is neutralized with an acid while the temperature of the slurry is kept at not less than 80° C. and more preferably at not less than 90° C. Examples of the acid used here include sulfuric acid, hydrochloric acid, nitric acid, phosphoric acid, and acetic acid. These can adjust the pH of the slurry preferably at not more than 7.5 and more preferably at not more than 7 so that the particle surface of the infrared reflective material can be coated with high-density silica.

Moreover, to perform porous silica coating on the particle surface of the infrared reflective material, first, an acid such as sulfuric acid, hydrochloric acid, nitric acid, phosphoric acid, and acetic acid is added to an aqueous slurry of the infrared reflective material to adjust pH at 1 to 4 and preferably at 1.5 to 3. The temperature of the slurry is preferably adjusted at 50 to 70° C. Next, while the pH of the slurry is kept in the range, a silicate and an acid are added to form a coating of porous silica. As the silicate, various silicates such as sodium silicate and potassium silicate can be used. Addition of the silicate is usually preferably performed over not less than 15 minutes, and more preferably over not less than 30 minutes. After addition of the silicate is completed, an alkali compound is added when necessary to adjust the pH of the slurry at approximately 6 to 9. Thus, the particle surface of the infrared reflective material can be coated with porous silica.

On the other hand, to perform alumina coating on the particle surface of the infrared reflective material, preferably, first, a slurry of the infrared reflective material is neutralized at pH of 8 to 9 with an alkali such as sodium hydroxide, and heated to a temperature of not less than 50° C., and next, an aluminum compound and an aqueous acid are added concurrently. As the aluminum compound, aluminates such as sodium aluminate and potassium aluminate can be suitably used. As the aqueous acid, aqueous solutions of sulfuric acid, hydrochloric acid, nitric acid, and the like can be suitably used. The concurrent addition means a method for continuously or intermittently adding a small amount of the aluminum compound and a small amount of the aqueous acid separately to a reactor. Specifically, it is preferable that the aluminum compound and the aqueous acid be simultaneously added over approximately 10 minutes to 2 hours while the pH in the reactor is kept at 8.0 to 9.0. Preferably, after adding the aluminum compound and the aqueous acid, the aqueous acid is further added to adjust the pH at approximately 5 to 6.

Crystallinity of the complex oxide is further increased by firing the complex oxide coated with the inorganic compound or organic compound again. This can suppress water elution properties of the alkaline earth metal elements, the manganese element, and the iron element, and is preferable. The temperature of firing the complex oxide again is preferably in the range of 200 to 1500° C., and more preferably in the range of 400 to 1200° C. While the atmosphere at the time of firing the complex oxide again may be any atmosphere, firing in the air is preferable in order to keep a sufficient infrared reflectivity. The time of firing the complex oxide again can be set properly, and is preferably for 0.5 to 24 hours and more preferably for 1.0 to 12 hours.

The complex oxide obtained by the method can be used in various forms such as powder and a molded body. In the case where the complex oxide is used as powder, it may be properly ground when necessary to adjust the particle size thereof. In the case where the complex oxide is used as a molded body, the powder thereof may be molded into an appropriate size and shape. As a mill, impact mills such as hammer mills and pin mills, grinding mills such as roller mills and pulverizers, and stream mills such as jet mills can be used, for example. As a molding machine, general-purpose molding machines such as extrusion machines and granulators can be used, for example.

Moreover, while the infrared reflective material according to the present invention has sufficient infrared reflectivity, mixing of a compound having other infrared reflectivity or a compound having an infrared shielding (absorption) ability can further enhance infrared reflectivity, or can complement reflective performance at a specific wavelength. As the compound having infrared reflectivity or the compound having an infrared shielding (absorption) ability, those conventionally used can be used. Specifically, examples thereof include inorganic compounds such as titanium dioxide, antimony-doped tin oxide, tungsten oxide, and lanthanum boride, and metal powders such as metallic silver powder and metallic copper powder. Titanium dioxide and metal powder are more preferable. The kind and mixing proportion of the compound having infrared reflectivity or the compound having an infrared shielding (absorption) ability can be properly selected according to application thereof.

Moreover, the infrared reflective material according to the present invention has a color of white or black. Mixing of other pigment to this can further strengthen whiteness or blackness, or can provide the infrared reflective material having a color such as red, yellow, green, blue, and intermediate colors thereof. As the pigment, inorganic pigments, organic pigments, lake pigments, and the like can be used. Specifically, examples of the inorganic pigment include white pigments such as titanium dioxide, zinc white, and precipitated barium sulfate, red pigments such as iron oxide, blue pigments such as ultramarine blue and Prussian blue (potassium ferric ferrocyanide), black pigments such as carbon black, and pigments such as aluminum powder. Examples of the organic pigment include organic compounds such as anthraquinone, perylene, phthalocyanine, azo compounds, and azo methiazo compounds. The kind and mixing proportion of the pigment can be properly selected according to the color and hue.

Next, the present invention is a coating material characterized by containing the infrared reflective material, and the coating material according to the present invention includes a composition called an ink. Moreover, the present invention is a resin composition characterized by containing the infrared reflective material. Moreover, the present invention is an infrared reflector, wherein the coating material prepared by blending the infrared reflective material is applied onto a base material.

The infrared reflective material according to the present invention is contained in resins for coating materials, inks, and plastic molded products such as films. Thereby, a composition using the excellent infrared reflectivity of the infrared reflective material can be obtained. Such coating materials, inks, and resin compositions can contain an arbitrary amount of the infrared reflective material based on the resin. The amount of the infrared reflective material is preferably not less than 0.1% by weight, more preferably not less than 1% by weight, and still more preferably not less than 10% by weight. In addition, a composition forming material used in each field may be blended, and various kinds of additives may be further blended.

In the case where the infrared reflective material is used as the coating material and the ink, specifically, other than a coating film forming material or an ink film forming material, a solvent, a dispersing agent, a pigment, a filler, an aggregate, a thickener, a flow controlling agent, a leveling agent, a curing agent, a crosslinking agent, a catalyst for curing, and the like can be blended. As the coating film forming material, organic components such as acrylic resins, alkyd resins, urethane resins, polyester resins, and amino resins, and inorganic components such as organosilicate, organotitanate, cement, and gypsum can be used, for example. As the ink film forming material, urethane resins, acrylic resins, polyamide resins, salt vinyl acetate resins, chlorinated propylene resins, and the like can be used. Various kinds of resins such as heat-curable resins, resins curable at room temperature, and ultraviolet-curable resins can be used for these of the coating film forming material and the ink film forming material without limitation. Using an ultraviolet-curable resin of a monomer or an oligomer, a photopolymerization initiator and a photosensitizer are blended. The obtained mixture is applied, and irradiated with ultraviolet light to cure the ultraviolet-curable resin. Thereby, without applying thermal load to the base material, a coating film having high hardness and adhesion is preferably obtained.

The coating material according to the present invention can be applied onto a base material to produce an infrared reflector. This infrared reflector can be used as an infrared shielding material and as a thermal insulation material. As a base material, those of various materials and various quality can be used. Specifically, various building materials, civil engineering materials, and the like can be used. The produced infrared reflector can be used as a roof material, a walling material, and a flooring material for houses and factories, and a paving material that forms roads and pavements. The thickness of the infrared reflector can be arbitrarily set according to various applications. For example, in the case where the infrared reflector is used as a roof material, the thickness thereof is usually 0.1 to 0.6 mm, and preferably 0.1 to 0.3 mm. In the case where the infrared reflector is used as a paving material, the thickness thereof is usually 0.5 to 5 mm and preferably 1 to 5 mm. In order to apply the coating material onto the base material, a method for applying or spraying and a method using a trowel are possible. After applying, the coating may be dried, burned, or cured when necessary.

In the case where the infrared reflective material is used as a resin composition, a resin, a pigment, a dye, a dispersing agent, a lubricant, an antioxidant material, an ultraviolet absorbing agent, a light stabilizer, an antistatic agent, a flame retardant, a sanitizer, and the like are kneaded with the infrared reflective material according to the present invention, and are molded into an arbitrary form such as a film form, a sheet form, and a plate form. As the resin, thermoplastic resins such as polyolefin resins, polystyrene resins, polyester resins, acrylic resins, polycarbonate resins, fluororesins, polyamide resins, cellulosic resins, and polylactic resins, and heat-curable resins such as phenol resins and urethane resins can be used. Such a resin composition can be molded into an arbitrary form such as a film, a sheet, and a plate, and can be used as infrared reflectors for industrial uses, agricultural uses, and home uses. The composition can be used also as a thermal insulation material that shields infrared rays.

EXAMPLES

Hereinafter, the present invention will be described using Examples and Comparative Examples, but the present invention will not be limited to those Examples.

Example 1

3.68 g of calcium carbonate $CaCO_3$ (made by Kojundo Chemical Laboratory Co., Ltd., purity of 99.99%) and 2.94 g of high purity titanium dioxide (PT-301 made by Ishihara Sangyo Kaisha, Ltd., purity of 99.99%) were sufficiently mixed and stirred with an agate mortar. Then, a predetermined amount of the mixture was placed into an alumina crucible, and fired at 1200° C. for 4 hours to obtain calcium titanate ($CaTiO_3$) having a perovskite type structure (Sample A).

The specific surface of Sample A was 1.03 $m^2/g$, and the average particle size calculated from the value was 0.72 μm. The content of chromium was not more than a measurement limit of detection.

Example 2

4.02 g of strontium carbonate $SrCO_3$ (made by Kojundo Chemical Laboratory Co., Ltd., purity of 99.99%) and 2.18 g of high purity titanium dioxide (PT-301 made by Ishihara Sangyo Kaisha, Ltd., purity of 99.99%) were sufficiently mixed and stirred with an agate mortar. Then, a predetermined amount of the mixture was placed into an alumina crucible, and fired at 1200° C. for 4 hours to obtain strontium titanate ($SrTiO_3$) having a perovskite type structure (Sample B) was obtained.

The specific surface of Sample B was 1.33 $m^2/g$. The content of chromium was not more than a measurement limit of detection.

Example 3

4.23 g of barium carbonate $BaCO_3$ (made by Kojundo Chemical Laboratory Co., Ltd., purity of 99.99%) and 1.71 g of high purity titanium dioxide (PT-301 made by Ishihara Sangyo Kaisha, Ltd., purity of 99.99%) were sufficiently mixed and stirred with an agate mortar. Then, a predetermined amount of the mixture was placed into an alumina crucible, and fired at 1200° C. for 4 hours to obtain barium titanate ($BaTiO_3$) having a perovskite type structure (Sample C).

The specific surface of Sample C was 1.39 $m^2/g$. The content of chromium was not more than a measurement limit of detection.

Example 4

3.68 g of calcium carbonate $CaCO_3$ (made by Kojundo Chemical Laboratory Co., Ltd., purity of 99.99%) and 2.94 g of high purity titanium dioxide (PT-301 made by Ishihara Sangyo Kaisha, Ltd., purity of 99.99%) were sufficiently mixed and stirred with an agate mortar. Then, a predetermined amount of the mixture was placed into an alumina crucible, and fired at 1400° C. for 4 hours to obtain calcium titanate ($CaTiO_3$) having a perovskite type structure (Sample D).

The specific surface of Sample D was 0.59 $m^2/g$, and the average particle size calculated from the value was 1.23 μm. The content of chromium was not more than a measurement limit of detection.

Example 5

2.79 g of calcium carbonate $CaCO_3$ (made by Kojundo Chemical Laboratory Co., Ltd., purity of 99.99%) and 3.43 g of zirconium oxide (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain calcium zirconate ($CaZrO_3$) having a perovskite type structure (Sample E). The content of chromium was not more than a measurement limit of detection.

Example 6

3.25 g of strontium carbonate $SrCO_3$ (made by Kojundo Chemical Laboratory Co., Ltd., purity of 99.99%) and 2.72 g of zirconium oxide (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain strontium zirconate ($SrZrO_3$) having a perovskite type structure (Sample F). The content of chromium was not more than a measurement limit of detection.

Example 7

6.87 g of calcium carbonate $CaCO_3$ (made by Kojundo Chemical Laboratory Co., Ltd., purity of 99.99%) and 3.65 g of high purity titanium dioxide (PT-301 made by Ishihara Sangyo Kaisha, Ltd., purity of 99.99%) were sufficiently mixed and stirred with an agate mortar. Then, as a fusing agent, 5.26 g of sodium chloride NaCl (made by Kojundo Chemical Laboratory Co., Ltd., purity of 99.99%), and 5.26 g of potassium chloride KCl (made by Kojundo Chemical Laboratory Co., Ltd., purity of 99.99%) were added, and further sufficiently mixed and stirred with the agate mortar. Then, a predetermined amount of the mixture was placed into an alumina crucible, and fired at 1400° C. for 4 hours, and washed with water to obtain calcium titanate ($Ca_3Ti_2O_7$) having a layered perovskite type structure (Sample G). The content of chromium was not more than a measurement limit of detection.

Example 8

3.68 g of calcium carbonate $CaCO_3$ (made by Kojundo Chemical Laboratory Co., Ltd., purity of 99.99%) and 2.93 g of high purity titanium dioxide (PT-301 made by Ishihara Sangyo Kaisha, Ltd., purity of 99.99%), and 0.01 g of aluminum oxide $Al_2O_3$ (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain aluminum containing calcium titanate ($CaTiO_3$:Al) having a perovskite type structure (Sample H). The atomic ratio (molar ratio) of aluminum and titanium (Al/Ti) was 0.005. The content of chromium was not more than a measurement limit of detection.

Example 9

3.70 g of calcium carbonate $CaCO_3$ (made by Kojundo Chemical Laboratory Co., Ltd., purity of 99.99%) and 2.86 g of high purity titanium dioxide (PT-301 made by Ishihara Sangyo Kaisha, Ltd., purity of 99.99%), and 0.06 g of aluminum oxide $Al_2O_3$ (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain aluminum containing calcium titanate ($CaTiO_3$:Al) having a perovskite type structure (Sample I).

The specific surface of Sample I was 0.13 $m^2/g$, and the average particle size calculated from the value was 11 μm. The atomic ratio (molar ratio) (Al/Ti) of aluminum and titanium was 0.03. The content of chromium was not more than a measurement limit of detection.

Examples 10 to 16

With respect to calcium carbonate $CaCO_3$ (made by Kojundo Chemical Laboratory Co., Ltd., purity of 99.99%), high purity titanium dioxide (PT-301 made by Ishihara Sangyo Kaisha, Ltd., purity of 99.99%), and manganese dioxide $MnO_2$ (made by Kojundo Chemical Laboratory Co., Ltd., purity of 99.99%), the respective amounts described in Table 1 were weighed, and sufficiently mixed and stirred with an agate mortar. Then, a predetermined amount of each mixture was placed into an alumina crucible, and fired at 1400° C. for 4 hours to obtain manganese containing calcium titanate having a perovskite type structure (Samples J to P).

Atomic ratios (molar ratio) (Mn/Ti) of manganese and titanium in Samples J to P were 0.11, 0.25, 0.41, 0.67, 0.96, 1.5, and 2.22 from the results of fluorescent X-ray spectrographic analysis (RIX2100, made by Rigaku Corporation), respectively. The content of chromium in each Sample was not more than a measurement limit of detection. Table 1 shows each specific surface of Samples J, L, N and P, and each average particle size calculated from the value of the specific surface.

TABLE 1

| Sample | | Calcium carbonate (g) | Titanium dioxide (g) | Manganese dioxide (g) | Specific surface ($m^2/g$) | Average particle size (μ/m) |
|---|---|---|---|---|---|---|
| Example 10 | J | 3.66 | 2.63 | 0.32 | 1.54 | 0.86 |
| Example 11 | K | 3.64 | 2.33 | 0.63 | — | — |
| Example 12 | L | 3.62 | 2.02 | 0.94 | 1.03 | 1.38 |
| Example 13 | M | 3.61 | 1.73 | 1.25 | — | — |
| Example 14 | N | 3.59 | 1.43 | 1.68 | 0.75 | 1.86 |
| Example 15 | O | 3.57 | 1.14 | 1.86 | — | — |
| Example 16 | P | 3.55 | 0.85 | 2.16 | 0.32 | 4.25 |

Examples 17 to 20

With respect to calcium carbonate $CaCO_3$ (made by Kojundo Chemical Laboratory Co., Ltd., purity of 99.99%), high purity titanium dioxide (PT-301 made by Ishihara Sangyo Kaisha, Ltd., purity of 99.99%), and iron sesquioxide $Fe_2O_3$ (made by Kojundo Chemical Laboratory Co., Ltd., purity of 99.99%), the respective amounts described in Table 2 were weighed, and sufficiently mixed and stirred with an agate mortar. Then, a predetermined amount of each mixture was placed into an alumina crucible, and fired at 1400° C. for 4 hours to obtain iron containing calcium titanate having a perovskite type structure (Samples Q to T).

Atomic ratios (molar ratio) of iron and titanium (Fe/Ti) in Samples Q to T were 0.12, 0.28, 0.43, and 0.70, respectively from the results of fluorescent X-ray spectrographic analysis (RIX2100, made by Rigaku Corporation). The content of chromium in each Sample was not more than a measurement limit of detection.

TABLE 2

| | Sample | Calcium carbonate (g) | Titanium dioxide (g) | Iron sesquioxide (g) |
|---|---|---|---|---|
| Example 17 | Q | 3.66 | 2.63 | 0.29 |
| Example 18 | R | 3.64 | 2.32 | 0.58 |
| Example 19 | S | 3.62 | 2.02 | 0.87 |
| Example 20 | T | 3.60 | 1.72 | 1.15 |

Example 21

3.59 g of calcium carbonate $CaCO_3$ (made by Kojundo Chemical Laboratory Co., Ltd., purity of 99.99%), 2.02 g of high purity titanium dioxide (PT-301 made by Ishihara Sangyo Kaisha, Ltd., purity of 99.99%), 0.94 g of manganese dioxide $MnO_2$ (made by Kojundo Chemical Laboratory Co., Ltd., purity of 99.99%), and 0.01 g of magnesium oxide (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1400° C. for 4 hours to obtain manganese and magnesium containing calcium titanate ($CaTiO_3$: Mn, Mg) having a perovskite type structure (Sample U). The atomic ratio (molar ratio) of magnesium to calcium (Mg/Ca) was 0.01, and the atomic ratio (molar ratio) of manganese to titanium (Mn/Ti) was 0.43. The content of chromium was not more than a measurement limit of detection.

Example 22

3.62 g of calcium carbonate $CaCO_3$ (made by Kojundo Chemical Laboratory Co., Ltd., purity of 99.99%), 2.02 g of high purity titanium dioxide (PT-301 made by Ishihara Sangyo Kaisha, Ltd., purity of 99.99%), 0.94 g of manganese dioxide $MnO_2$ (made by Kojundo Chemical Laboratory Co., Ltd., purity of 99.99%), and 0.01 g of α-alumina α-$Al_2O_3$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1400° C. for 4 hours to obtain manganese and aluminum containing calcium titanate ($CaTiO_3$: Mn,Al) having a perovskite type structure (Sample V).

The specific surface of Sample V was 0.50 $m^2/g$, and the average particle size calculated from the value was 2.86 μm. The atomic ratio (molar ratio) of manganese to titanium (Mn/Ti) was 0.43, and the atomic ratio (molar ratio) of aluminum to titanium (Al/Ti) was 0.007. The content of chromium was not more than a measurement limit of detection.

Example 23

In Example 22, the same procedure as that of Example 22 was performed except that 0.01 g of α-alumina was changed into 0.02 g, to obtain manganese and aluminum containing calcium titanate ($CaTiO_3$: Mn,Al) having a perovskite type structure (Sample W). The atomic ratio (molar ratio) of manganese to titanium (Mn/Ti) was 0.43, and the atomic ratio (molar ratio) of aluminum to titanium (Al/Ti) was 0.014. The content of chromium was not more than a measurement limit of detection.

Example 24

In Example 22, the same procedure as that of Example 22 was performed except that 0.03 g of gallium oxide (made by Kojundo Chemical Laboratory Co., Ltd., purity of 99.99%) was used instead of 0.01 g of α-alumina, to obtain manganese and gallium containing calcium titanate ($CaTiO_3$:Mn,Ga) having a perovskite type structure (Sample X). The atomic ratio (molar ratio) of manganese to titanium (Mn/Ti) was 0.43, and the atomic ratio (molar ratio) of gallium to titanium (Ga/Ti) was 0.014. The content of chromium was not more than a measurement limit of detection.

Example 25

3.59 g of calcium carbonate $CaCO_3$ (made by Kojundo Chemical Laboratory Co., Ltd., purity of 99.99%), 1.43 g of high purity titanium dioxide (PT-301 made by Ishihara Sangyo Kaisha, Ltd., purity of 99.99%), 1.56 g of manganese dioxide $MnO_2$ (made by Kojundo Chemical Laboratory Co., Ltd., purity of 99.99%), and 0.01 g of α-alumina α-$Al_2O_3$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1400° C. for 4 hours to obtain manganese and aluminum containing calcium titanate (CaTiO$_3$:Mn,Al) having a perovskite type structure (Sample Y).

The specific surface of Sample Y was 0.74 m$^2$/g, and the average particle size calculated from the value was 1.88 μm. The atomic ratio (molar ratio) of manganese to titanium (Mn/Ti) was 1.01, and the atomic ratio (molar ratio) of aluminum to titanium (Al/Ti) was 0.01. The content of chromium was not more than a measurement limit of detection.

Example 26

3.64 g of calcium carbonate CaCO$_3$ (made by Kojundo Chemical Laboratory Co., Ltd., purity of 99.99%), 1.16 g of high purity titanium dioxide (PT-301 made by Ishihara Sangyo Kaisha, Ltd., purity of 99.99%), 1.27 g of manganese dioxide MnO$_2$ (made by Kojundo Chemical Laboratory Co., Ltd., purity of 99.99%), and 0.19 g of α-alumina α-Al$_2$O$_3$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1400° C. for 4 hours to obtain manganese and aluminum containing calcium titanate (CaTiO$_3$: Mn,Al) having a perovskite type structure (Sample Z). The atomic ratio (molar ratio) of manganese to titanium (Mn/Ti) was 1.25, and the atomic ratio (molar ratio) of aluminum to titanium (Al/Ti) was 0.25. The content of chromium was not more than a measurement limit of detection.

Example 27

3.60 g of calcium carbonate CaCO$_3$ (made by Kojundo Chemical Laboratory Co., Ltd., purity of 99.99%), 1.87 g of high purity titanium dioxide (PT-301 made by Ishihara Sangyo Kaisha, Ltd., purity of 99.99%), 0.94 g of manganese dioxide MnO$_2$ (made by Kojundo Chemical Laboratory Co., Ltd., purity of 99.99%), and 0.15 g of zinc oxide ZnO (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain manganese and zinc containing calcium titanate (CaTiO$_3$: Mn, Zn) having a perovskite type structure (Sample a). The atomic ratio (molar ratio) of manganese to titanium (Mn/Ti) was 0.77, and the atomic ratio (molar ratio) of zinc to titanium (Zn/Ti) was 0.08. The content of chromium was not more than a measurement limit of detection.

Example 28

3.31 g of strontium carbonate SrCO$_3$ (made by Kojundo Chemical Laboratory Co., Ltd., purity of 99.99%), 2.48 g of zirconium oxide (made by Kojundo Chemical Laboratory Co., Ltd., purity of 99.99%), and 0.19 g of manganese dioxide MnO$_2$ (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain manganese containing strontium zirconate (SrZrO$_3$:Mn) having a perovskite type structure (Sample b). The atomic ratio (molar ratio) of manganese to zirconium (Mn/Zr) was 0.11. The content of chromium was not more than a measurement limit of detection.

Example 29

3.31 g of strontium carbonate SrCO$_3$ (made by Kojundo Chemical Laboratory Co., Ltd., purity of 99.99%), 2.48 g of zirconium oxide (made by Kojundo Chemical Laboratory Co., Ltd., purity of 99.99%), 0.19 g of manganese dioxide MnO$_2$ (made by Kojundo Chemical Laboratory Co., Ltd., purity of 99.99%), and 0.01 g of α-alumina α-Al$_2$O$_3$ (made by Kojundo Chemical Laboratory Co., Ltd., purity of 99.99%) were sufficiently mixed and stirred with an agate mortar. Then, a predetermined amount of the mixture was placed into an alumina crucible, and fired at 1400° C. for 4 hours to obtain manganese and aluminum containing strontium zirconate (SrZrO$_3$:Mn,Al) having a perovskite type structure (Sample c). The atomic ratio (molar ratio) of manganese to zirconium (Mn/Zr) was 0.11, and the atomic ratio (molar ratio) of aluminum to zirconium (Al/Zr) was 0.006. The content of chromium was not more than a measurement limit of detection.

Example 30

7.18 g of calcium carbonate CaCO$_3$ (made by Kojundo Chemical Laboratory Co., Ltd., purity of 99.99%), 2.83 g of titanium dioxide (TTO-55A made by Ishihara Sangyo Kaisha, Ltd., titanium dioxide having aluminum hydroxide existing on a particle surface (Al/Ti=0.03)), 3.12 g of manganese dioxide MnO$_2$ (made by Kojundo Chemical Laboratory Co., Ltd., purity of 99.99%), and 0.02 g of α-alumina α-Al$_2$O$_3$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1200° C. for 4 hours to obtain manganese and aluminum containing calcium titanate (CaTiO$_3$:Mn,Al) having a perovskite type structure (Sample d).

The atomic ratio (molar ratio) of manganese to titanium (Mn/Ti) was 1.01, and the atomic ratio (molar ratio) of aluminum to titanium (Al/Ti) was 0.040. Calcium was 1 mol based on 1 mol of the total amount of titanium, manganese, and aluminum.

Example 31

7.48 g of calcium carbonate CaCO$_3$ (made by Kojundo Chemical Laboratory Co., Ltd., purity of 99.99%), 2.79 g of titanium dioxide (TTO-55A made by Ishihara Sangyo Kaisha, Ltd., titanium dioxide having aluminum hydroxide existing on a particle surface (Al/Ti=0.03)), 3.07 g of manganese dioxide MnO$_2$ (made by Kojundo Chemical Laboratory Co., Ltd., purity of 99.99%), and 0.02 g of α-alumina α-Al$_2$O$_3$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1200° C. for 4 hours to obtain manganese and aluminum containing calcium titanate (CaTiO$_3$: Mn,Al) having a perovskite type structure (Sample e).

The atomic ratio (molar ratio) of manganese and titanium (Mn/Ti) was 1.01, and the atomic ratio (molar ratio) of aluminum to titanium (Al/Ti) was 0.040. Calcium was 1.06 mol based on 1 mol of the total amount of titanium, manganese, and aluminum.

Example 32

7.67 g of calcium carbonate CaCO$_3$ (made by Kojundo Chemical Laboratory Co., Ltd., purity of 99.99%), 2.76 g of titanium dioxide (TTO-55A made by Ishihara Sangyo Kaisha, Ltd., titanium dioxide having aluminum hydroxide existing on a particle surface (Al/Ti=0.03)), 3.03 g of manganese dioxide $MnO_2$ (made by Kojundo Chemical Laboratory Co., Ltd., purity of 99.99%), and 0.02 g of α-alumina α-$Al_2O_3$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1200° C. for 4 hours to obtain manganese and aluminum containing calcium titanate ($CaTiO_3$: Mn,Al) having a perovskite type structure (Sample f).

The atomic ratio (molar ratio) of manganese to titanium (Mn/Ti) was 1.01, and the atomic ratio (molar ratio) of aluminum to titanium (Al/Ti) was 0.040. Calcium was 1.10 mol based on 1 mol of the total amount of titanium, manganese, and aluminum.

Example 33

2.87 g of calcium carbonate $CaCO_3$ (made by Kojundo Chemical Laboratory Co., Ltd., purity of 99.99%), 1.13 g of titanium dioxide (TTO-55A made by Ishihara Sangyo Kaisha, Ltd., titanium dioxide having aluminum hydroxide existing on a particle surface (Al/Ti=0.03)), 1.25 g of manganese dioxide $MnO_2$ (made by Kojundo Chemical Laboratory Co., Ltd., purity of 99.99%), and 0.01 g of aluminum hydroxide $Al(OH)_3$ (made by Kojundo Chemical Laboratory Co., Ltd., purity of 99.99%) were weighed, and sufficiently mixed and stirred with an agate mortar. The obtained mixture was made into a slurry with water, and subsequently was evaporated to dryness. Next, the obtained solid was ground with an agate mortar. Then, a predetermined amount of the mixture was placed into an alumina crucible, and fired at 1200° C. for 4 hours to obtain manganese and aluminum containing calcium titanate ($CaTiO_3$: Mn,Al) having a perovskite type structure (Sample g).

The atomic ratio (molar ratio) of manganese to titanium (Mn/Ti) was 1.01, and the atomic ratio (molar ratio) of aluminum to titanium (Al/Ti) was 0.040.

Example 34

In Example 33, the same procedure as that of Example 33 was performed except that 1.11 g of titanium dioxide (TTO-55N made by Ishihara Sangyo Kaisha, Ltd.) not having aluminum hydroxide existing on the particle surface was used instead of titanium dioxide having aluminum hydroxide existing on the particle surface, and 0.04 g of aluminum hydroxide $Al(OH)_3$ (made by Kojundo Chemical Laboratory Co., Ltd., purity of 99.99%) was used. Thus, manganese and aluminum containing calcium titanate ($CaTiO_3$: Mn,Al) having a perovskite type structure (Sample h).

The atomic ratio (molar ratio) of manganese to titanium (Mn/Ti) was 1.01, and the atomic ratio (molar ratio) of aluminum to titanium (Al/Ti) was 0.040.

Example 35

In Example 33, the same procedure as that of Example 33 was performed except that 0.31 g of potassium carbonate $K_2CO_3$ (made by Kishida Chemical Co., Ltd., purity of 99.5%) was added to the slurry of the mixture, and subsequently evaporated to dryness. Thus, manganese and aluminum containing calcium titanate ($CaTiO_3$: Mn,Al) having a perovskite type structure (Sample i).

The atomic ratio (molar ratio) of manganese to titanium (Mn/Ti) was 1.01, and the atomic ratio (molar ratio) of aluminum to titanium (Al/Ti) was 0.040.

Example 36

In Example 33, the same procedure as that of Example 33 was performed except that 0.17 g of lithium carbonate $Li_2CO_3$ (made by Kishida Chemical Co., Ltd., purity of 99.99%) was added to the slurry of the mixture, and subsequently evaporated to dryness. Thus, manganese and aluminum containing calcium titanate ($CaTiO_3$: Mn,Al) having a perovskite type structure (Sample j) was obtained.

The atomic ratio (molar ratio) of manganese to titanium (Mn/Ti) was 1.01, and the atomic ratio (molar ratio) of aluminum to titanium (Al/Ti) was 0.040.

Example 37

7.00 g of calcium carbonate $CaCO_3$ (made by Kojundo Chemical Laboratory Co., Ltd., purity of 99.99%), 2.46 g of titanium dioxide (TTO-55A made by Ishihara Sangyo Kaisha, Ltd., titanium dioxide having aluminum hydroxide existing on a particle surface (Al/Ti=0.03)), 3.04 g of manganese dioxide $MnO_2$ (made by Kojundo Chemical Laboratory Co., Ltd., purity of 99.99%), 0.03 g of aluminum hydroxide $Al(OH)_3$ (made by Kojundo Chemical Laboratory Co., Ltd., purity of 99.99%), and 0.53 g of tin dioxide $SnO_2$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1200° C. for 4 hours to obtain manganese, aluminum, and tin containing calcium titanate ($CaTiO_3$:Mn,Al,Sn) having a perovskite type structure (Sample k).

The atomic ratio (molar ratio) of manganese to titanium (Mn/Ti) was 1.12, the atomic ratio (molar ratio) of aluminum to titanium (Al/Ti) was 0.040, and the atomic ratio (molar ratio) of tin to titanium (Sn/Ti) was 0.11.

Example 38

7.07 g of calcium carbonate $CaCO_3$ (made by Kojundo Chemical Laboratory Co., Ltd., purity of 99.99%), 2.51 g of titanium dioxide (TTO-55A made by Ishihara Sangyo Kaisha, Ltd., titanium dioxide having aluminum hydroxide existing on a particle surface (Al/Ti=0.03)), 3.07 g of manganese dioxide $MnO_2$ (made by Kojundo Chemical Laboratory Co., Ltd., purity of 99.99%), 0.03 g of aluminum hydroxide $Al(OH)_3$ (made by Kojundo Chemical Laboratory Co., Ltd., purity of 99.99%), and 0.44 g of zirconium dioxide $ZrO_2$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1200° C. for 4 hours to obtain manganese, aluminum, and zirconium containing calcium titanate ($CaTiO_3$:Mn,Al,Zr) having a perovskite type structure (Sample 1).

The atomic ratio (molar ratio) of manganese to titanium (Mn/Ti) was 1.12, the atomic ratio (molar ratio) of aluminum to titanium (Al/Ti) was 0.040, and the atomic ratio (molar ratio) of zirconium to titanium (Zr/Ti) was 0.11.

Example 39

7.19 g of calcium carbonate $CaCO_3$ (made by Kojundo Chemical Laboratory Co., Ltd., purity of 99.99%), 2.78 g of titanium dioxide (TTO-55A made by Ishihara Sangyo Kaisha, Ltd., titanium dioxide having aluminum hydroxide existing on a particle surface (Al/Ti=0.03)), 3.12 g of manganese dioxide $MnO_2$ (made by Kojundo Chemical Laboratory Co., Ltd., purity of 99.99%), 0.03 g of aluminum hydroxide Al(OH)$_3$ (made by Kojundo Chemical Laboratory Co., Ltd., purity of 99.99%), and 0.04 g of silicon dioxide SiO$_2$ (made by Kojundo Chemical Laboratory Co., Ltd., purity of 99.99%) were weighed, and sufficiently mixed and stirred with an agate mortar. Then, a predetermined amount of the mixture was placed into an alumina crucible, and fired at 1200° C. for 4 hours to obtain manganese, aluminum, and silicon containing calcium titanate (CaTiO$_3$:Mn,Al,Si) having a perovskite type structure (Sample m).

The atomic ratio (molar ratio) of manganese to titanium (Mn/Ti) was 1.03, the atomic ratio (molar ratio) of aluminum to titanium (Al/Ti) was 0.040, and the atomic ratio (molar ratio) of silicon to titanium (Si/Ti) was 0.021.

Example 40

Sample g obtained in Example 33 was suspended in pure water, and subjected to ultrasonic dispersion for 10 minutes to prepare a slurry.

This slurry was heated. While the slurry was kept at 75° C., under stirring, 10% by weight of sodium silicate as SiO$_2$ was added to the slurry over 60 minutes. Then, the slurry was stirred for 30 minutes at 90° C. Then, 2% sulfuric acid was added over 80 minutes until the pH of the slurry reached 8. A preset temperature was set at 60° C., and subsequently the slurry was matured for 60 minutes.

Next, the pH of the slurry was adjusted at 9. Then, at the slurry temperature of 60° C., 2% by weight of sodium aluminate as Al$_2$O$_3$ and sulfuric acid were added simultaneously over 60 minutes. The slurry was matured for 30 minutes, and subsequently filtered, washed, and dried to obtain manganese and aluminum containing calcium titanate (CaTiO$_3$:Mn,Al) having a perovskite type structure and coated with 10% by weight of silica in a first layer and 2% by weight of alumina in a second layer (Sample n).

Example 41

A predetermined amount of Sample n obtained in Example 40 was placed into an alumina crucible, and fired again at 700° C. for 1 hour to obtain manganese and aluminum containing calcium titanate (CaTiO$_3$:Mn,Al) having a perovskite type structure and coated with silica and alumina (Sample o).

Example 42

A predetermined amount of Sample g obtained in Example 33 was placed into an alumina crucible, and fired again at 900° C. for 4 hours to obtain manganese and aluminum containing calcium titanate (CaTiO$_3$:Mn,Al) having a perovskite type structure (Sample p).

The BET specific surface area value was 1.23 m$^2$/g.

Example 43

A predetermined amount of Sample g obtained in Example 33 was placed into an alumina crucible, and fired again at 800° C. for 2 hours to obtain manganese and aluminum containing calcium titanate (CaTiO$_3$:Mn,Al) having a perovskite type structure (Sample q).

Comparative Example 1

Titanium dioxide made by Ishihara Sangyo Kaisha, Ltd. (white material for near-infrared reflection) was used as Comparison Sample r.

Comparative Example 2

2.94 g of yttrium oxide Y$_2$O$_3$ (made by Kojundo Chemical Laboratory Co., Ltd., purity of 99.99%) and 2.27 g of manganese dioxide MnO$_2$ (made by Kojundo Chemical Laboratory Co., Ltd., purity of 99.99%) were sufficiently mixed and stirred with an agate mortar. Then, a predetermined amount of the mixture was placed into an alumina crucible, and fired at 1200° C. for 4 hours to obtain yttrium manganate (YMnO$_3$) (Comparison Sample s).

Comparative Example 3

Commercially available infrared reflective oxide black materials Pigment Black 17 <Cr2O3> and Pigment Black 27 <(Co,Fe)(Fe,Cr)2O4> were used as Comparison Sample t and Comparison Sample u, respectively.

As the results of X-ray diffraction of Samples (A to Z, and a to q) obtained in Examples, except Sample f, only a compound corresponding to each composition could be identified, and it was found that the composition is a single phase.

The samples obtained in Examples and Comparative Examples (A to I, and r) were sufficiently ground with an agate mortar. Then, each of the samples was placed into an aluminum ring having a diameter of 30 mm, and press molded at a load of 9.8 MPa. The color of the powder was measured with a whiteness meter NW-1 (made by Nippon Denshoku Industries Co., Ltd.). The results were shown in Table 3.

Moreover, each of the samples obtained in Examples and Comparative Examples (A to I, and r) was placed into a dedicated cell, and the spectral reflectance (reflectance of light at a wavelength of 350 to 2100 nm) was measured with an ultraviolet visible near-infrared spectrophotometer V-570 (made by JASCO Corporation, using a Spectralon <made by Labsphere Inc.> as a standard reflecting plate). Next, according to JIS R 3106, the solar reflectance (reflectance of near infrared rays of the sunlight at a wavelength in the range of 700 to 2100 nm) was calculated, and shown in Table 3.

It was found that Samples A to I obtained in Examples have the L* value of not less than 75, and have sufficient whiteness. It was also found that Samples A to F, H, and I have the L* value of not less than 90, which is approximately the same or more than that of Comparison Sample r, and have high whiteness. In addition, Samples A to F, H, and I show a hue in which the a* value is approximately −3 to 10, and the b* value is approximately 1 to 10. These show that the present invention can be used as a white material.

It was also found that the solar reflectances of Samples A to I obtained in Examples all are higher than that of Comparison Sample r, the relative value is 109 to 124 wherein the solar reflectance of Comparison Sample r is 100, and Samples A to I all have sufficient infrared reflectivity. It was also recognized that containing of aluminum improves the solar reflectance.

TABLE 3

| | Color of powder | | | Solar reflectance (700 to 2100 nm) | Relative value wherein solar reflectance (700 to 2100 nm) of Sample p |
|---|---|---|---|---|---|
| | L* | a* | b* | (%) | is "100" |
| Sample A | 94.6 | 2.7 | 1.9 | 82.8 | 109 |
| Sample B | 97.0 | 0.0 | 3.0 | 85.7 | 113 |
| Sample C | 98.7 | −2.2 | 4.5 | 87.3 | 115 |

TABLE 3-continued

| | Color of powder | | | Solar reflectance (700 to 2100 nm) (%) | Relative value wherein solar reflectance (700 to 2100 nm) of Sample p is "100" |
|---|---|---|---|---|---|
| | L* | a* | b* | | |
| Sample D | 94.0 | 1.5 | 1.9 | 84.0 | 111 |
| Sample E | 98.2 | −2.6 | 1.8 | 93.6 | 124 |
| Sample F | 96.3 | −1.3 | 3.3 | 92.1 | 122 |
| Sample G | 78.8 | 9.4 | 9.8 | 87.5 | 116 |
| Sample H | 94.0 | 1.6 | 2.0 | 91.7 | 121 |
| Sample I | 93.8 | 2.1 | 4.2 | 92.0 | 122 |
| Comparison Sample r | 94.4 | −2.4 | 2.0 | 75.9 | 100 |

The color of the powders of Samples obtained in Examples and Comparative Examples (J to Z, a to c, and s to u) was measured by the method, and the results were shown in Table 4. Moreover, the solar reflectance (reflectance of near infrared rays of the sunlight at a wavelength in the range of 700 to 2100 nm) was calculated by the method, and shown in Table 4.

Samples J to P obtained in Examples (manganese containing calcium titanate) have sufficient blackness. Particularly Samples K to P show the L* value of not more than 40 and a hue in which the a* value is approximately 0 to 20, and the b* value is approximately −1 to 10. These show that the present invention is used as a black material. It was also found that the solar reflectances of Samples J to P all are higher than that of Comparison Sample u, a relative value is 117 to 249 in Samples K to P wherein the solar reflectance of Comparison Sample u is 100, and Samples J to P all have sufficient infrared reflectivity. Moreover, it was found that Samples K to M bear comparison with Comparison Samples s and t, and are a black material having high infrared reflectivity.

Moreover, Samples Q to T (iron containing calcium titanate) obtained in Examples have sufficient blackness, and the L* value is not more than 40. In addition, Samples Q to T show a hue in which the a* value is approximately 0 to 10, and the b* value is approximately 1 to 5. These show that the present invention can be used as a black material. Although the solar reflectances of Samples Q to T did not exceed that of Comparison Sample u, Samples Q to T have an advantage that they do not contain chromium. Particularly, it was found that Sample Q has approximately the same solar reflectance and blackness as those of Comparison Sample u.

In manganese containing calcium titanate, improvement in the solar reflectance was recognized by containing magnesium, aluminum, gallium, and zinc in Samples U to Z and a.

Also in strontium zirconate, it was confirmed that blackness could be obtained by containing manganese, and that the solar reflectance could be improved by containing aluminum.

TABLE 4

| | Color of powder | | | Solar reflectance (700 to 2100 nm) (%) | Relative value wherein solar reflectance (700 to 2100 nm) of Sample s is "100" |
|---|---|---|---|---|---|
| | L* | a* | b* | | |
| Sample J | 41.2 | 16.7 | 19.5 | 70.7 | 284 |
| Sample K | 34.7 | 15.1 | 9.9 | 62.0 | 249 |
| Sample L | 31.0 | 9.0 | 3.3 | 52.1 | 209 |
| Sample M | 28.1 | 4.4 | 0.3 | 43.8 | 176 |
| Sample N | 28.1 | 1.6 | −0.6 | 36.8 | 148 |
| Sample O | 29.1 | 1.1 | 0.1 | 33.0 | 133 |
| Sample P | 29.3 | 0.0 | 0.1 | 29.1 | 117 |
| Sample Q | 28.5 | 7.3 | 2.1 | 23.2 | 93 |
| Sample R | 26.1 | 2.1 | 1.2 | 14.5 | 58 |
| Sample S | 26.7 | 1.2 | 1.1 | 13.8 | 55 |
| Sample T | 30.4 | 2.2 | 4.1 | 16.1 | 65 |
| Sample U | 30.3 | 7.9 | 2.1 | 57.3 | 230 |
| Sample V | 31.4 | 8.4 | 2.3 | 59.6 | 239 |
| Sample W | 30.8 | 8.5 | 2.3 | 59.6 | 239 |
| Sample X | 28.7 | 7.5 | 1.7 | 58.9 | 237 |
| Sample Y | 28.9 | 0.0 | −0.6 | 48.4 | 194 |
| Sample Z | 26.7 | 6.7 | 1.9 | 49.3 | 198 |
| Sample a | 32.9 | 9.6 | 5.5 | 57.3 | 230 |
| Sample b | 24.8 | 3.7 | 2.0 | 20.7 | 83 |
| Sample c | 26.0 | 6.2 | 3.6 | 28.0 | 112 |
| Comparison Sample s | 23.7 | −3.9 | −7.8 | 40.8 | 164 |
| Comparison Sample t | 24.9 | 4.3 | 0.9 | 36.6 | 147 |
| Comparison Sample u | 24.1 | 3.6 | 0.6 | 24.9 | 100 |

Using Samples (d to f) obtained in Examples, the solar reflectances (reflectance of near infrared rays of the sunlight at a wavelength in the range of 700 to 2100 nm and reflectance of the sunlight at a wavelength in the range of 300 to 2100 nm) were calculated by the method, and shown in Table 5. The color of the powders of Samples d to f was measured by the method, and the results were shown in Table 6.

It was found that the solar reflectance of Sample e (manganese and aluminum containing calcium titanate wherein α/β=1.06) is approximately 104 as a relative value wherein the solar reflectance of Sample d (manganese and aluminum containing calcium titanate wherein α/β=1.00) is 100, and Sample e is a black pigment having higher infrared reflectivity. On the other hand, although the solar reflectance of Sample f (manganese and aluminum containing calcium titanate wherein α/β=1.10) was high, production of other phase was recognized.

TABLE 5

| | Solar reflectance (300 to 2100 nm) | Relative value wherein solar reflectance (300 to 2100 nm) of Sample d is "100" | Solar reflectance (700 to 2100 nm) (%) | Relative value wherein solar reflectance (700 to 2100 nm) of Sample d is "100" |
|---|---|---|---|---|
| Sample d | 32.7 | 100 | 47.4 | 100 |
| Sample e | 33.7 | 103 | 49.1 | 104 |
| Sample f | 34.8 | 106 | 51.2 | 108 |

TABLE 6

| | Color of powder | | |
|---|---|---|---|
| | $L^*$ | $a^*$ | $b^*$ |
| Sample d | 26.6 | 2.1 | −0.5 |
| Sample e | 25.9 | 4.7 | −0.1 |
| Sample f | 26.3 | 5.7 | 0.9 |

TABLE 7

| | Solar reflectance (700 to 2100 nm) (%) |
|---|---|
| Sample g | 46.1 |
| Sample h | 25.3 |
| Sample i | 46.0 |
| Sample j | 46.2 |

Using Samples (g to j) obtained in Examples, the solar reflectance (reflectance of near infrared rays of the sunlight at a wavelength in the range of 700 to 2100 nm) was calculated by the method, and shown in Table 7.

Comparing Sample g with Sample h, it was found that Sample g using titanium dioxide in which aluminum hydroxide is made to exist on the particle surface of titanium dioxide in advance has higher solar reflectance and higher infrared reflectivity.

The solar reflectance of Sample i (to which a potassium compound was added) and that of Sample j (to which a lithium compound was added) were approximately the same as that of Sample g (to which no potassium compound nor lithium compound was added).

Figure 2:
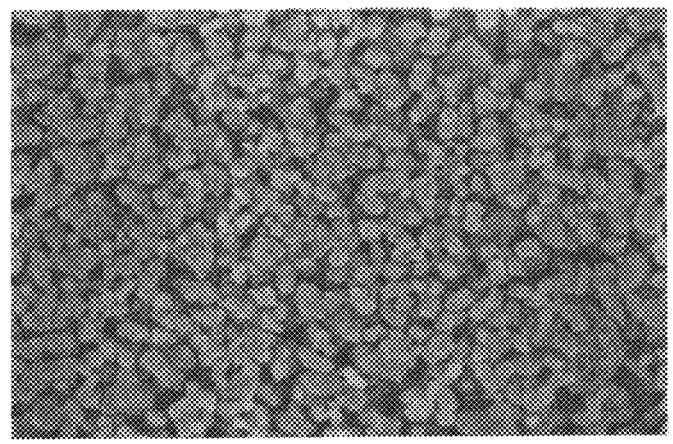
FIG. 2 is an electron micrograph showing a form of particles of Sample i obtained in Example 35.
Figure 3:
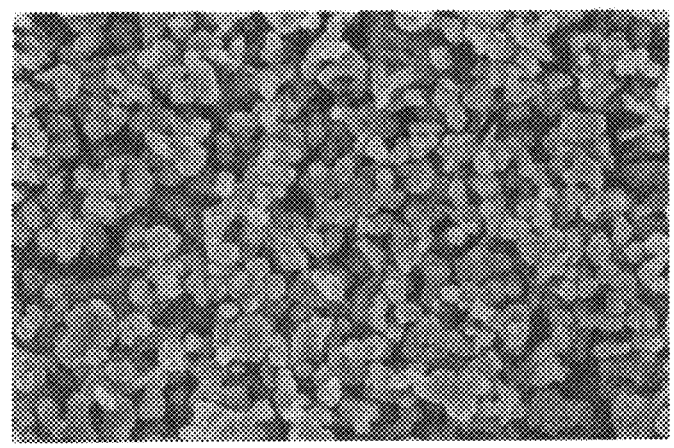
FIG. 3 is an electron micrograph showing a form of particles of Sample j obtained in Example 36.
Figure 4:
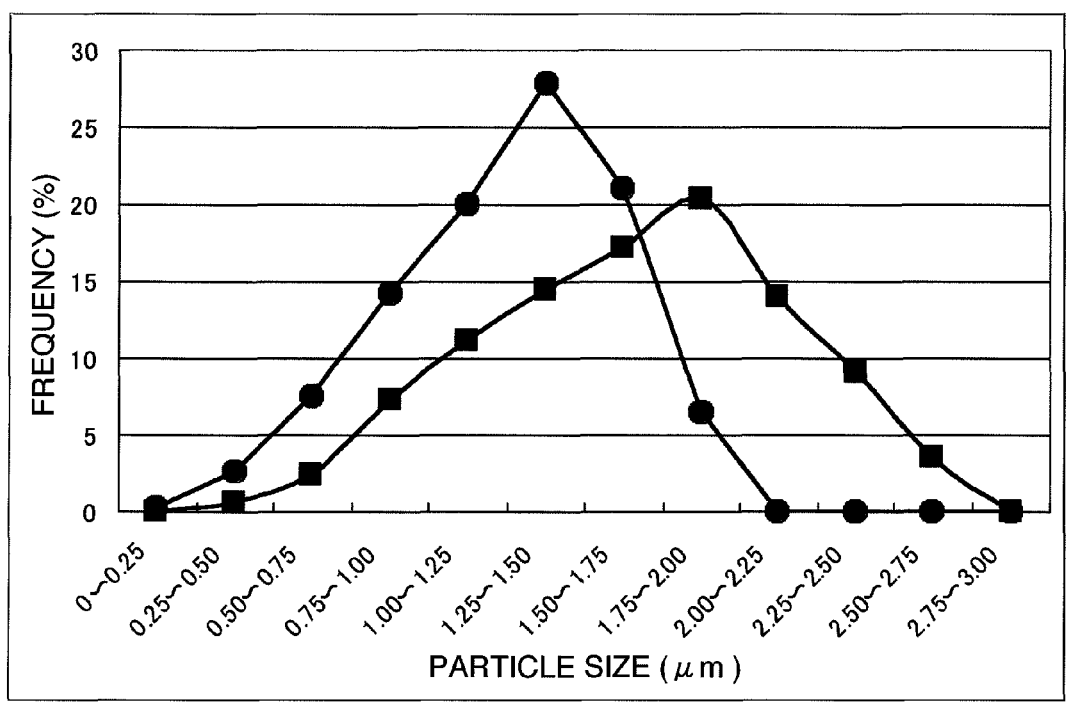
FIG. 4 is a diagram showing particle size distribution of Sample g obtained in Example 33 (expressed with ■ in the diagram), and that of Sample i obtained in Example 35 (expressed with ● in the diagram).

FIGS. 1 to 3 show electron micrographs of Samples g, i, and j. It was found that Samples i and j have a particle size more uniform than that of Sample g. FIG. 4 shows the result obtained by measuring particle size distribution of Sample i and Sample g with an image processing apparatus (LUZEX AP, made by Seishin Enterprise Co., Ltd.). It was found that Sample i (shown with ● in the diagram) has particle size distribution narrower than that of Sample g (shown with ■ in the diagram). In addition, it was found that the average particle size of Sample i is 1.23 μm and smaller than that of average particle size of Sample g, which is 1.65 μm.

Using Samples (k to m) obtained in Examples, the solar reflectances (reflectance of near infrared rays of the sunlight at a wavelength in the range of 700 to 2100 nm and reflectance of the sunlight at a wavelength in the range of 300 to 2100 nm) were calculated by the method, and shown in Table 8.

It was found that Samples k to m are a black pigment having infrared reflectivity higher than that of Comparison Sample u (Pigment Black 27 <(Co,Fe)(Fe,Cr)2O4>).

TABLE 8

| | Solar reflectance (300 to 2100 nm) (%) | Relative value wherein solar reflectance (300 to 2100 nm) of Comparison Sample u is "100" | Solar reflectance (700 to 2100 nm) (%) | Relative value wherein solar reflectance (700 to 2100 nm) of Comparison Sample u is "100" |
|---|---|---|---|---|
| Sample k | 27.3 | 140 | 37.7 | 151 |
| Sample l | 31.0 | 159 | 44.1 | 177 |
| Sample m | 27.6 | 142 | 38.5 | 155 |
| Comparison Sample u | 19.5 | 100 | 24.9 | 100 |

Using Sample g obtained in Example 33, a predetermined amount of Sample g was mixed with Comparison Sample r (titanium dioxide white material for near-infrared reflection) to obtain a mixture. As a comparison, a predetermined amount of commercially available carbon black (Comparison Sample v, made by Kojundo Chemical Laboratory Co., Ltd.) and a predetermined amount of Comparison Sample r were mixed to obtain a comparison mixture. The solar reflectances of these mixtures (reflectance of near infrared rays of the sunlight at a wavelength in the range of 700 to 2100 nm and reflectance of the sunlight at a wavelength in the range of 300 to 2100 nm) were calculated by the method, and shown in Table 9. Moreover, the color of the powder of the mixture was measured by the method, and the result was shown in Table 10.

When Comparison Sample r (titanium dioxide) is mixed with Sample g, as the proportion of Comparison Sample r is higher, the solar reflectance is gradually increased while the $L^*$ value is gradually increased. The same result is obtained even when Comparison Sample r (titanium dioxide) is mixed with carbon black (Comparison Sample v). However, comparing Samples having the $L^*$ value of 72 to 74, it was found that the solar reflectance is higher in those in which Sample g is mixed.

TABLE 9

| Mixed proportion of Sample g (% by weight) | Mixed proportion of Comparison Sample v (% by weight) | Mixed proportion of Comparison Sample r (% by weight) | Solar reflectance (300 to 2100 nm) | Relative value wherein solar reflectance (300 to 2100 nm) of Sample g is "100" | Solar reflectance (700 to 2100 nm) | Relative value wherein solar reflectance (700 to 2100 nm) of Sample g is "100" |
|---|---|---|---|---|---|---|
| 100 | 0 | 0 | 32.0 | 100 | 46.1 | 100 |
| 70 | 0 | 30 | 37.8 | 118 | 50.6 | 110 |
| 50 | 0 | 50 | 42.4 | 133 | 54.0 | 117 |
| 20 | 0 | 80 | 53.4 | 167 | 61.8 | 134 |
| 10 | 0 | 90 | 59.4 | 186 | 66.1 | 143 |
| 5 | 0 | 95 | 65.6 | 205 | 70.6 | 153 |
| 0 | 50 | 50 | 35.6 | 111 | 34.8 | 75 |
| 0 | 20 | 80 | 37.1 | 116 | 36.2 | 79 |
| 0 | 10 | 90 | 42.4 | 133 | 41.4 | 90 |
| 0 | 5 | 95 | 50.2 | 157 | 49.4 | 107 |
| 0 | 0 | 100 | 75.9 | 237 | 77.8 | 169 |

TABLE 10

| Mixed proportion of Sample g (% by weight) | Mixed proportion of Comparison Sample v (% by weight) | Mixed proportion of Comparison Sample r (% by weight) | Color of powder | | |
|---|---|---|---|---|---|
| | | | L* | a* | b* |
| 100 | 0 | 0 | 26.6 | 2.1 | −0.5 |
| 70 | 0 | 30 | 37.4 | 1.1 | −1.5 |
| 50 | 0 | 50 | 46.3 | 0.6 | −1.8 |
| 20 | 0 | 80 | 63.6 | −0.5 | −2.3 |
| 10 | 0 | 90 | 72.5 | −0.9 | −2.1 |
| 5 | 0 | 95 | 80.6 | −1.5 | −1.5 |
| 0 | 50 | 50 | 57.8 | −1 | −0.5 |
| 0 | 20 | 80 | 62.9 | −1.2 | −0.2 |
| 0 | 10 | 90 | 67.0 | −1.1 | 0.1 |
| 0 | 5 | 95 | 74.3 | −1.5 | −0.1 |
| 0 | 0 | 100 | 90.4 | −3 | 0.6 |

The water elution properties of Sample L obtained in Example 12 and that of calcium manganate ($Ca_2MnO_4$) prepared with a method described below were evaluated using the following method.

5 g of each sample was placed into a 500-ml aqueous solution adjusted at pH of 3 with hydrochloric acid. While the pH was kept at 3 using a pH controller (FD-02, made by Tokyo Glass Kikai Co., Ltd.), sampling was performed after 10 minutes, 40 minutes, 120 minutes, and 330 minutes. Each sampled slurry was filtered with a membrane filter (A045A047A, made by ADVANTEC) to recover a filtrate. The concentration of calcium ion included in the recovered filtrate was measured with a multi-ICP optical emission spectrometer (made by Varian Technologies Japan Ltd., 730-ES type). Table 11 shows values obtained by subtracting an initial value from the concentration of calcium ion after 40 minutes, from that after 120 minutes, and from that after 330 minutes where the concentration of calcium ion after 10 minutes is the initial value.

It was confirmed that the amount of Sample L in Example 12 to be eluted in water was significantly smaller than that of calcium manganate, and Sample L has high water elution resistance.

Method for Preparing Calcium Manganate 5.03 g of calcium carbonate $CaCO_3$ (made by Kojundo Chemical Laboratory Co., Ltd., 99.99%) and 2.18 g of manganese dioxide $MnO_2$ (made by Kojundo Chemical Laboratory Co., Ltd., 99.99%) each were weighed, and sufficiently mixed and stirred with an agate mortar. Then, a predetermined amount of the mixture was placed into an alumina crucible, and fired at 1200° C. for 4 hours to synthesize calcium manganate ($Ca_2MnO_4$).

TABLE 11

| Concentration of calcium ion (ppm) | Sample L | $Ca_2MnO_4$ |
|---|---|---|
| After 40 minutes | 3 | 287 |
| After 120 minutes | 5 | 621 |
| After 330 minutes | 10 | 1189 |

Table 12 shows the results of solar reflectance at 700 to 2100 nm in Sample g and n to q obtained in Examples. Moreover, Table 13 shows the results obtained by evaluating water elution properties of Samples g, o, and p by the method.

It was found that the solar reflectances of Samples n to q bear comparison with that of Sample g. It was also confirmed that the amount of calcium to be eluted in water in Samples g, o, and p was significantly smaller than that of Sample g in Example 33, and Samples g, o, and p have high water elution resistance.

TABLE 12

| | Solar reflectance (700 to 2100 nm) (%) |
|---|---|
| Sample g | 46.1 |
| Sample n | 45.5 |
| Sample o | 40.5 |
| Sample p | 43.8 |
| Sample q | 43.7 |

TABLE 13

| Concentration of calcium ion (ppm) | Sample g | Sample n | Sample o |
|---|---|---|---|
| After 10 minutes | 21 | 4 | 5 |
| After 40 minutes | 32 | 5 | 14 |
| After 120 minutes | 55 | 6 | 25 |
| After 240 minutes | 70 | 9 | 37 |

Further, Table 14 shows the results obtained by evaluating water elution properties of Samples g, p, and q obtained in Examples by the following method.

5 g of each sample was placed into a 500-mL of a hydrochloric acid aqueous solution adjusted at 0.2 mol/L (concentration; 10 g/L). The slurry was stirred for 2 hours while the temperature thereof was kept at 40° C. Then, the slurry was filtered with a membrane filter (A045A047A, made by ADVANTEC) to recover a filtrate. The concentration of calcium ion included in the recovered filtrate was measured with a multi-ICP optical emission spectrometer (made by Varian Technologies Japan Ltd., 730-ES type) (first measurement).

Next, the powder that remained on the membrane filter was dried at 60° C. for 2 hours, and again placed into a 500-mL hydrochloric acid aqueous solution adjusted at 0.2 mol/L (concentration; 10 g/L). Stirring for 2 hours at 40° C. was performed. The powder and a filtrate were recovered using the membrane filter. The concentration of calcium ion in the filtrate was measured with the above-mentioned ICP optical emission spectrometer (second measurement).

Subsequently, this operation was repeated, and the concentration of calcium ion was measured 4 times in total. Table 14 shows difference values obtained by subtracting the measured values of the concentration of calcium ion in Sample p from the measured values of the concentration of calcium ion in Sample g and difference values obtained by subtracting the measured values of the concentration of calcium ion in Sample q from the measured values of the concentration of calcium ion in Sample g.

As a result, it was confirmed that the amount of calcium to be eluted in water in Samples p and q was smaller than that of Sample g, and Samples p and q have high water elution resistance.

TABLE 14

| Difference value of concentration of calcium ion (ppm) | Sample p | Sample q |
|---|---|---|
| First measurement | 27 | 9 |
| Second measurement | 19 | 14 |
| Third measurement | 17 | 2 |
| Fourth measurement | 22 | 20 |

It was confirmed that Samples A to Z and a to q obtained in Examples are powder, and can be blended with a coating material or a resin composition.

INDUSTRIAL APPLICABILITY

The infrared reflective material according to the present invention is a perovskite type complex oxide containing at least an alkaline earth metal element and at least one element selected from titanium, zirconium, and niobium, and containing a manganese and/or an iron element, a Group IIIa element in the periodic table, a zinc element, and the like when necessary. The infrared reflective material has sufficient infrared reflectivity, and in addition, has excellent characteristics such as high thermal stability and heat resistance, and no concern about safety and environmental problems. Accordingly, the infrared reflective material according to the present invention can be used for various infrared reflective applications.

Particularly, because the infrared reflective material is resistant to dissolution in water and reduction in infrared reflectivity caused by elution is small, the infrared reflective material can be used for relaxation of the heat island phenomenon or the like, for example, by applying the infrared reflective material onto roofs and outer walls of buildings, by using the infrared reflective material as a resin composition for films and sheets, or by applying the infrared reflective material onto roads and pavements.

The invention claimed is:

1. An infrared reflective black material comprising (A) a perovskite complex oxide consisting essentially of a calcium element, a titanium element, a manganese element and an oxygen element, or (B) a perovskite complex oxide consisting essentially of a calcium element, a titanium element, a manganese element, an oxygen element and at least one element selected from the group consisting of an aluminum element, a gallium element and a zinc element, wherein the molar ratio of $0.11 < Mn/Ti < 1.25$ in the complex oxides (A) and (B), wherein a particle surface of the perovskite complex oxide is coated with an inorganic compound and/or an organic compound.

2. The infrared reflective black material according to claim 1, wherein $1 < \alpha/\beta \leq 1.5$ wherein a content of the calcium element is α mol, and a total content of the element selected from the group consisting of the titanium element, the manganese element the aluminum element, the gallium element, and the zinc element is β mol.

3. The infrared reflective black material according to claim 1, wherein the inorganic compound is a compound selected from the group consisting of silicon, zirconium, aluminum, titanium, antimony, phosphorus, and tin.

4. A coating material, comprising the infrared reflective black material according to claim 1.

5. An infrared reflector, comprising a base material onto which a coating material according to claim 4 is applied.

6. A resin composition, comprising the infrared reflective black material according to claim 1.

* * * * *